(12) United States Patent
Mao et al.

(10) Patent No.: US 10,951,150 B2
(45) Date of Patent: Mar. 16, 2021

(54) MOTOR SYSTEM WITH DISTRIBUTED WINDING STRUCTURES

(71) Applicant: Quanten Technologies, Inc., Allen, TX (US)

(72) Inventors: Hengchun Mao, Allen, TX (US); Xuezhong Jia, Allen, TX (US)

(73) Assignee: Quanten Technologies, Inc., Allen, TX (US)

( * ) Notice: Subject to any disclaimer, the term of this patent is extended or adjusted under 35 U.S.C. 154(b) by 87 days.

(21) Appl. No.: 16/102,966

(22) Filed: Aug. 14, 2018

(65) Prior Publication Data

US 2019/0058364 A1    Feb. 21, 2019

Related U.S. Application Data

(60) Provisional application No. 62/545,538, filed on Aug. 15, 2017.

(51) Int. Cl.
*H02P 25/18*   (2006.01)
*H02K 1/16*   (2006.01)
(Continued)

(52) U.S. Cl.
CPC .............. *H02P 25/18* (2013.01); *H02K 1/16* (2013.01); *H02K 3/12* (2013.01); *H02K 3/28* (2013.01); *H02K 3/48* (2013.01); *H02K 11/33* (2016.01); *H02K 15/024* (2013.01); *H02K 15/065* (2013.01); *H02K 17/14* (2013.01); *H02K 17/30* (2013.01); *H02P 25/024* (2016.02); *H02P 25/062* (2016.02); *H02P 25/064* (2016.02);
(Continued)

(58) Field of Classification Search
CPC .... H02P 25/024; H02P 25/062; H02P 25/064; H02P 25/092; H02P 25/107; H02P 25/22; H02K 1/16; H02K 11/33; H02K 3/12; H02K 3/28; H02K 3/48; H02K 15/024; H02K 15/065; H02K 17/14; H02K 17/30; H02K 2213/09
USPC ........................................................ 310/198
See application file for complete search history.

(56) References Cited

U.S. PATENT DOCUMENTS 5,754,024 A * 5/1998 Sugiyama ............... H02P 25/08
318/400.05
5,763,978 A     6/1998 Uchida et al.
(Continued)

FOREIGN PATENT DOCUMENTS

EP    1742329 A1    1/2007

*Primary Examiner* — Michael Andrews
(74) *Attorney, Agent, or Firm* — Slater Matsil, LLP

(57) ABSTRACT

A system comprises a stator magnetically coupled to a rotor and a plurality of conductor assemblies distributed evenly along a perimeter of the device, wherein each conductor assembly is evenly distributed into at least two branches of conductors, and wherein each branch comprising a plurality of conductors, all the branches form a plurality of windings, wherein a winding comprises a positive segment and a negative segment, and wherein each segment has a plurality of branches, and wherein one segment is in more than two conductor assemblies and the plurality of windings is symmetrically divided into a plurality of groups, wherein each group of windings forms a balanced multi-phase system and is connected to a connection bar, and wherein at least two connection bars are isolated from each other.

18 Claims, 51 Drawing Sheets

(51) Int. Cl.

| | | |
|---|---|---|
| H02K 3/48 | (2006.01) | |
| H02K 15/06 | (2006.01) | |
| H02K 3/28 | (2006.01) | |
| H02K 15/02 | (2006.01) | |
| H02K 3/12 | (2006.01) | |
| H02K 11/33 | (2016.01) | |
| H02K 17/14 | (2006.01) | |
| H02P 25/22 | (2006.01) | |
| H02K 17/30 | (2006.01) | |
| H02P 25/024 | (2016.01) | |
| H02P 25/062 | (2016.01) | |
| H02P 25/064 | (2016.01) | |
| H02P 25/092 | (2016.01) | |
| H02P 25/10 | (2006.01) | |

(52) U.S. Cl.
  CPC .......... *H02P 25/092* (2016.02); *H02P 25/107* (2013.01); *H02P 25/22* (2013.01); *H02K 2213/09* (2013.01)

(56) References Cited

U.S. PATENT DOCUMENTS

| | | | |
|---|---|---|---|
| 5,811,905 A * | 9/1998 | Tang | ............. H02K 3/28 |
| | | | 310/162 |
| 6,064,172 A | 5/2000 | Kuznetsov | |
| 7,772,729 B2 | 8/2010 | Adra | |
| 7,928,683 B2 | 4/2011 | Edelson | |
| 10,096,946 B2 | 10/2018 | Iizuka et al. | |
| 10,505,487 B2 | 12/2019 | Mao et al. | |
| 10,536,104 B2 | 1/2020 | Bando et al. | |
| 10,541,635 B2 | 1/2020 | Mao et al. | |
| 2003/0173842 A1 | 9/2003 | Kobayashi et al. | |
| 2004/0105160 A1 | 6/2004 | Kienzle et al. | |
| 2004/0119438 A1 | 6/2004 | Heigl et al. | |
| 2008/0103632 A1* | 5/2008 | Saban | ............. H02K 21/48 |
| | | | 700/286 |
| 2009/0140595 A1 | 6/2009 | Naganawa et al. | |
| 2010/0019714 A1 | 1/2010 | Fuchs | |
| 2010/0109458 A1 | 5/2010 | Hauser et al. | |
| 2012/0274186 A1 | 11/2012 | Huwyler et al. | |
| 2013/0026968 A1 | 1/2013 | Tagome et al. | |
| 2014/0265994 A1 | 9/2014 | Mao | |
| 2015/0061432 A1 | 3/2015 | Gilarranz et al. | |
| 2015/0372552 A1 | 12/2015 | Ito | |
| 2016/0056747 A1* | 2/2016 | Mao | ............. H02P 25/188 |
| | | | 318/777 |
| 2016/0141944 A1 | 5/2016 | Berger et al. | |
| 2016/0261161 A1 | 9/2016 | Roos | |
| 2016/0301273 A1 | 10/2016 | Hyde et al. | |
| 2016/0301348 A1* | 10/2016 | Mao | ............. H02P 25/18 |
| 2017/0047834 A1* | 2/2017 | Chan | ............. H02K 3/18 |
| 2017/0163138 A1 | 6/2017 | Pohl | |
| 2017/0366059 A1 | 12/2017 | Iizuka et al. | |
| 2019/0058364 A1 | 2/2019 | Mao et al. | |

\* cited by examiner

| Slot # | S1 | S2 | S3 | S4 | S5 | S6 | S7 | S8 | S9 | S10 | S11 | S12 | S13 | S14 | S15 | S16 | S17 | S18 | S19 |
|---|---|---|---|---|---|---|---|---|---|---|---|---|---|---|---|---|---|---|---|
| Top Conductor | A+ | A+ | F- | F- | B+ | B+ | G- | G- | C+ | C+ | H-+ | H- | D+ | D+ | I- | I- | E+ | E+ | A- |
| Bottom Conductor | E- | A+ | A+ | F- | F- | B+ | B+ | G- | G- | C+ | C+ | H- | H- | D+ | D+ | I- | I- | E+ | E+ |

| Slot # | S20 | S21 | S22 | S23 | S24 | S25 | S26 | S27 | S28 | S29 | S30 | S31 | S32 | S33 | S34 | S35 | S36 |
|---|---|---|---|---|---|---|---|---|---|---|---|---|---|---|---|---|---|
| Top Conductor | A- | F+ | F+ | B- | B- | G+ | G+ | C- | C-- | H+ | H+ | D- | D- | I+ | I+ | E- | E- |
| Bottom Conductor | A- | A- | F+ | F+ | B- | B- | G+ | G+ | C- | C- | H+ | H+ | D- | D- | I+ | I+ | E- |

Figure 37

| Slot # | S1 | S2 | S3 | S4 | S5 | S6 | S7 | S8 | S9 | S10 | S11 | S12 | S13 | S14 | S15 | S16 | S17 | S18 | S19 |
|---|---|---|---|---|---|---|---|---|---|---|---|---|---|---|---|---|---|---|---|
| Top Conductor | A+ | A+ | F- | F- | B+ | B+ | G- | G- | C+ | C+ | H-+ | H- | D+ | D+ | I- | I- | E+ | E+ | A- |
| Bottom Conductor | E- | A+ | A+ | F- | F- | B+ | B+ | G- | G- | C+ | C+ | H- | H- | D+ | D+ | I- | I- | E+ | E+ |

| Slot # | S20 | S21 | S22 | S23 | S24 | S25 | S26 | S27 | S28 | S29 | S30 | S31 | S32 | S33 | S34 | S35 | S36 |
|---|---|---|---|---|---|---|---|---|---|---|---|---|---|---|---|---|---|
| Top Conductor | A- | F+ | F+ | B- | B- | G+ | G+ | C- | C-- | H+ | H+ | D- | D- | I+ | I+ | E- | E- |
| Bottom Conductor | A- | A- | F+ | F+ | B- | B- | G+ | G+ | C- | C- | H+ | H+ | D- | D- | I+ | I+ | E- |

| Slot # | S37 | S38 | S39 | S40 | S41 | S42 | S43 | S44 | S45 | S46 | S47 | S48 | S49 | S50 | S51 | S52 | S53 | S54 |
|---|---|---|---|---|---|---|---|---|---|---|---|---|---|---|---|---|---|---|
| Top Conductor | A+ | A+ | F- | F- | B+ | B+ | G- | G- | C+ | C+ | H-+ | H- | D+ | D+ | I- | I- | E+ | E+ | A- |
| Bottom Conductor | E- | A+ | A+ | F- | F- | B+ | B+ | G- | G- | C+ | C+ | H- | H- | D+ | D+ | I- | I- | E+ | E+ |

| Slot # | S55 | S56 | S57 | S58 | S59 | S60 | S61 | S62 | S63 | S64 | S65 | S66 | S67 | S68 | S69 | S70 | S71 | S72 |
|---|---|---|---|---|---|---|---|---|---|---|---|---|---|---|---|---|---|---|
| Top Conductor | A- | F+ | F+ | B- | B- | G+ | G+ | C- | C-- | H+ | H+ | D- | D- | I+ | I+ | E- | E- |
| Bottom Conductor | A- | A- | F+ | F+ | B- | B- | G+ | G+ | C- | C- | H+ | H+ | D- | D- | I+ | I+ | E- |

Figure 39

| Slot # | S1 | S2 | S3 | S4 | S5 | S6 | S7 | S8 | S9 | S10 | S11 | S12 | S13 | S14 | S15 | S16 | S17 | S18 | S19 |
|---|---|---|---|---|---|---|---|---|---|---|---|---|---|---|---|---|---|---|---|
| Top Conductor | A+ | A+ | F- | F- | B+ | B+ | G- | G- | C+ | C+ | H-+ | H- | D+ | D+ | I- | I- | E+ | A- | A- |
| Bottom Conductor | E- | A+ | A+ | F- | F- | B+ | B+ | G- | G- | C+ | C+ | H- | H- | D+ | D+ | I- | E+ | E+ | A- |

| Slot # | S20 | S21 | S22 | S23 | S24 | S25 | S26 | S27 | S28 | S29 | S30 | S31 | S32 | S33 | S34 | S35 | S36 |
|---|---|---|---|---|---|---|---|---|---|---|---|---|---|---|---|---|---|
| Top Conductor | F+ | F+ | B- | B- | G+ | G+ | C- | C-- | H+ | H+ | D- | D- | I+ | I+ | E- | A+ | A+ |
| Bottom Conductor | A- | F+ | F+ | B- | B- | G+ | G+ | C- | C- | H+ | H+ | D- | D- | I+ | E- | E- | A+ |

| Slot # | S37 | S38 | S39 | S40 | S41 | S42 | S43 | S44 | S45 | S46 | S47 | S48 | S49 | S50 | S51 | S52 | S53 | S54 |
|---|---|---|---|---|---|---|---|---|---|---|---|---|---|---|---|---|---|---|
| Top Conductor | F- | F- | B+ | B+ | G- | G- | C+ | C+ | H-+ | H- | D+ | D+ | I- | I- | E+ | E+ | E+ | A- |
| Bottom Conductor | A+ | F- | F- | B+ | B+ | G- | G- | C+ | C+ | H- | H- | D+ | D+ | I- | I- | I- | E+ | E+ |

| Slot # | S55 | S56 | S57 | S58 | S59 | S60 | S61 | S62 | S63 | S64 | S65 | S66 | S67 | S68 | S69 | S70 | S71 | S72 |
|---|---|---|---|---|---|---|---|---|---|---|---|---|---|---|---|---|---|---|
| Top Conductor | A- | F+ | F+ | B- | B- | G+ | G+ | C- | C-- | H+ | H+ | D- | D- | I+ | I+ | E- | E- | E- |
| Bottom Conductor | A- | A- | F+ | F+ | B- | B- | G+ | G+ | C- | C- | H+ | H+ | D- | D- | I+ | I+ | I+ | E- |

Figure 40

MOTOR SYSTEM WITH DISTRIBUTED WINDING STRUCTURES

This application claims the benefit of U.S. Provisional Application No. 62/545,538, filed on Aug. 15, 2017, entitled "Advanced Dynamically Reconfigurable Motor and Generator Systems," which application is hereby incorporated herein by reference.

TECHNICAL FIELD

The present disclosure relates to a motor and/or generator system, and, in particular embodiments, to innovative technologies which improve the design, construction and manufacturing of advanced motors/generators and drive systems.

BACKGROUND

An electric machine (motor or generator) is an apparatus converting energy between electric power and mechanical rotary motion. There are different types of electric machines including induction machines, permanent magnets machines, switching reluctance machines, synchronous reluctance machines and hybrid machines. The various embodiments in this disclosure are applicable to the different types of electric machines above, which are configured as either motors or generators. Induction motors as an example are used to illustrate the innovative aspects of the present disclosure. The induction motor comprises a stator and a rotor. The stator is the stationary part and the rotor is the rotating part. The rotor may be inside the stator, outside the stator or beside the stator as in an axial field machine. An induction motor having a rotor inside a stator is used as an example to illustrate the innovative aspects of the present disclosure. A small motor air gap exists between the rotor and the stator for mechanical clearance and mechanical torque generation.

The squirrel cage inductor motor is the most common electric machine. The stator of the squirrel cage inductor motor comprises a plurality of windings. The plurality of windings usually forms a plurality of phase belt arranged in pole pairs. The rotor of the squirrel cage induction motor comprises a shaft and a squirrel cage made of metal bars contained in a magnetic structure such as a laminated silicon steel stack. The shaft is surrounded by the metal bars. First ends of the metal bars are connected by a first interconnect ring. Second ends of the metal bars are connected by a second interconnect ring.

In operation, the electric power is usually applied to the stator. As a result, a first magnetic field is created in the stator and in the air gap. The first magnetic field rotates in time at a synchronous speed with alternating current (ac) power applied to the stator windings. The first magnetic field induces electric currents in the metal bars of the rotor. The induced current produces a second magnetic field in the rotor. The second magnetic field of the rotor reacts against the first magnetic field of the stator. According to Lenz's Law, the rotor follows the rotating first magnetic field and generates a mechanical torque pulling the rotor into rotation. In a motor mode, the rotor will fall behind the first magnetic field. The speed difference between the first magnetic field and the rotor keeps inducing the electric current inside the rotor. If a load is applied to the rotor and the rotor falls further behind the first magnetic field, more torque will be developed due to the lag between the rotor and the first magnetic field. In other words, the torque of the motor is approximately proportional to the slip between the speed of the rotor and the speed of the first magnetic field.

The theoretical speed of the rotor in an induction motor traditionally depends on the frequency of the electric power supply and the arrangement of poles the stator coils. With no load on the motor, the speed of the rotor is equal to or approximately equal to the synchronous speed of the rotating magnetic field. The synchronous speed of an inductor motor is determined by the frequency of the electric power supply and the number of poles of the inductor motor. In particular, the speed of the induction motor is equal to the frequency of the electric power supply times 60 and further divided by the number of pole pairs.

As energy efficiency becomes an increasingly important issue, more motors and generators are coupled to power electronics equipment in variable speed applications, such as industrial drives, electrical vehicles, diesel-generator sets, servo systems, and wind power generation. Many of these applications require the motors and generators to operate over a wide speed and power range, and traditional technologies cannot satisfy the performance and cost requirements for such applications. Especially, as renewable energy becomes an important issue, more motors are used to drive electrical vehicles. There may be a need for having a motor operating efficiently over a wide speed and power range. Traditional motors cannot satisfy the performance and cost requirements for such applications. It has become a significant issue, which presents challenges to the system design of the motor system.

It would be desirable to have a high performance motor system exhibiting good behaviors such as high efficiency over a variety of speed and power range conditions at a low cost.

SUMMARY

These and other problems are generally solved or circumvented, and technical advantages are generally achieved, by preferred embodiments of the present disclosure which provide a reconfigurable motor system capable of dynamically adjusting the number of poles and/or phases.

In accordance with an embodiment, an apparatus comprises a stator magnetically coupled to a rotor and a plurality of conductor assemblies distributed evenly along a perimeter of the apparatus, wherein each conductor assembly is distributed into at least two branches of conductors, wherein each branch comprising a plurality of conductors, all the branches form a plurality of windings, wherein a winding comprises a positive segment and a negative segment, and wherein each segment has a plurality of branches, and wherein each segment is in more than two conductor assemblies and the plurality of windings are configured to be coupled to a plurality of power converters, wherein the plurality of power converters and the plurality of windings are configured such that the number of poles of the apparatus is dynamically adjustable through adjusting the phase angle relationship of currents flowing through the plurality of windings by controlling the plurality of power converters.

In accordance with another embodiment, a device comprises a stator magnetically coupled to a rotor and a plurality of conductor assemblies distributed evenly along a perimeter of the device, wherein each conductor assembly is evenly distributed into at least two branches of conductors, and wherein each branch comprising a plurality of conductors, all the branches form a plurality of windings, wherein a winding comprises a positive segment and a negative segment, and wherein each segment has a plurality of branches, and wherein one segment is in more than two conductor assemblies and the plurality of windings is symmetrically divided into a plurality of groups, wherein each group of windings forms a balanced multi-phase system and is connected to a connection bar, and wherein at least two connection bars are isolated from each other.

In accordance with yet another embodiment, a method comprises providing a device having a plurality of conductor assemblies distributed along a perimeter of the device, the plurality of conductor assemblies being organized into a plurality of windings, wherein each winding comprises a plurality of branches and each branch is spread into at least two conductor assemblies, and wherein each branch comprises a plurality of conductors, coupling a plurality of power converter groups having a plurality of power sources to the plurality of windings and configuring the plurality of power converter groups such that the number of poles and the number of phases in a pair of poles of the device is dynamically adjustable.

An advantage of an embodiment of the present disclosure is a reconfigurable motor system capable of dynamically adjusting the number of poles and/or phases. As a result, reconfigurable motor system can achieve high performance under a variety of operating conditions.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 37 illustrates a first exemplary winding arrangement of a reconfigurable motor system having thirty six slots in the stator in accordance with various embodiments of the present disclosure;

FIG. 39 shows another winding arrangement in accordance with various embodiments of the present disclosure;

FIG. 40 shows yet another winding arrangement in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
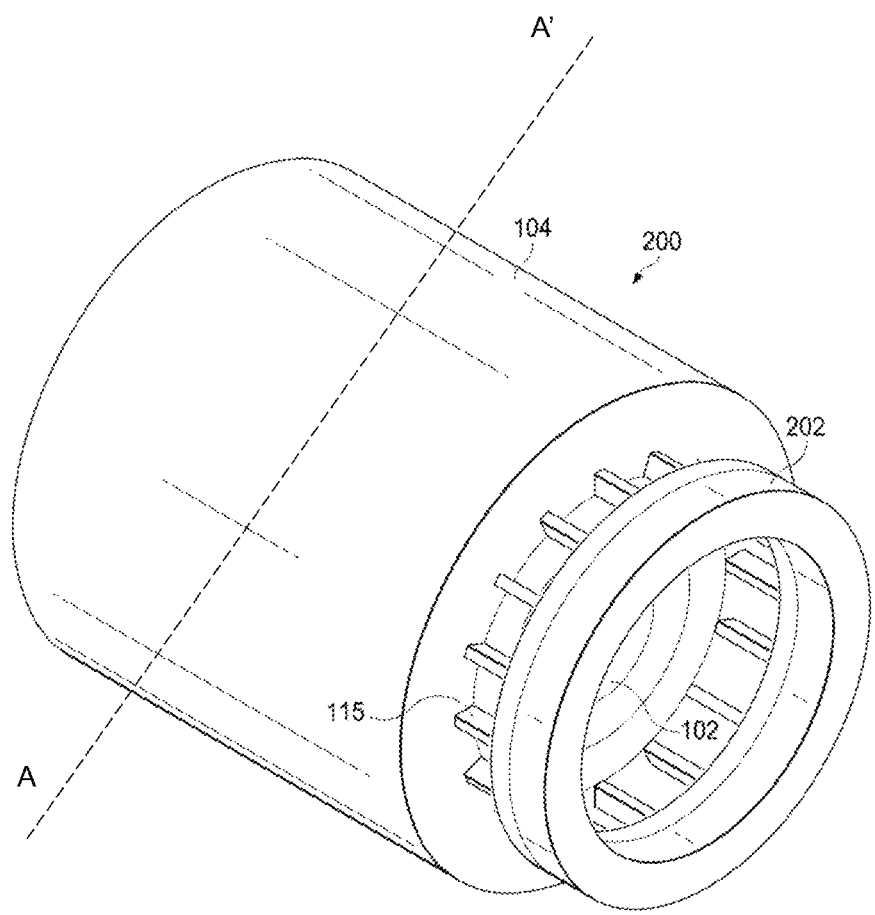
FIG. 1 illustrates a perspective view of a motor system in accordance with various embodiments of the present disclosure.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a reconfigurable motor system. There are different types of electric machines including induction machines, permanent magnets machines, switching reluctance machines, synchronous reluctance machines, and hybrid machines. The various embodiments in this disclosure are applicable to the electric machines above. The disclosure may also be applied, however, to a variety of electric machines and machine systems. Hereinafter, various embodiments will be explained in detail with reference to the accompanying drawings.

The present disclosure will be described with respect to preferred embodiments in a specific context, namely a dynamically reconfigurable induction motor (DRIM) system/technology for improving the traditional motor technology by dynamically changing the number of poles and/or the number of phases through various power electronics control mechanisms. With the DRIM system/technology, the efficiency and reliability of the system can be significantly increased while the system cost is reduced. It should be noted that the general principles of the innovative aspects in this disclosure may be also applied to electric machines with a fixed number of poles and/or phases.

This disclosure presents further improvements in motor/generator design and manufacturing processes. Although the discussion uses a motor as an example, the same principles can be applicable to generators.

The number of poles and number of phases in a pair of poles in a motor can impact its operation and performance significantly. In traditional motors, the number of poles and the number of phases are determined by the winding construction and connection. In a DRIM motor, the windings are arranged to have open connections. The number of poles (2P) and the number of phases in a pair of poles are determined by the currents flowing through the windings (N), which enables the numbers of P and N to be dynamically changed in real-time operation through controlling the phase relationship of the winding currents. In some embodiments, there may be a plurality of power converters. The plurality of power converters is divided into a plurality of power converter groups. The motor has a plurality of conductors. The plurality of conductors is divided into a plurality of groups of conductors. In some embodiments, the plurality of conductors is divided into the plurality of groups consecutively. In alternative embodiments, the plurality of conductors is divided symmetrically into the plurality of groups of conductors. In some embodiments, the power converters coupled to a group of conductors are configured to control phase relationships of currents flowing through the group of conductors.

This control of the winding currents can be achieved through coupling a plurality of power converters to the windings. A suitable control algorithm is employed to control the operation of the plurality of power converters. As a result, the motor and the associated motor drive system become a software defined system. The operation and performance of the software defined system can be improved over a wide range of operating conditions and with simulated and/or actual operation data through a self-learning and optimizing algorithm with real-time software update capability, thereby resulting in much better performance and cost tradeoffs. The benefits of the software defined system are especially significant for systems with complex operation modes such electrical vehicles. In addition, the energy efficiency, reliability and cost of the system can be improved simultaneously by applying the DRIM technology to the motor. For example, the system can continue to operate even though some windings in the motor, or some parts in a power converter are failed, as the failed parts or failed windings can be isolated and disabled with the rest of the system, which is still working. It is also feasible to disable some power converters and/or some windings to make the system operate with a reduced number of phases to improve system efficiency at light load. The technique of reducing the number of phases of a motor is similar to the phase-shading technique used in dc-dc converters.

FIG. 1 illustrates a perspective view of a motor system in accordance with various embodiments of the present disclosure. The motor system 200 comprises a rotor 102 and a stator 104. The rotor 102 is inside and surrounded by the stator 104. The stator 104 comprises a stator core, a plurality of stator windings and a connection ring 202. The plurality of stator windings (e.g., stator winding 115) is embedded in the stator core. The plurality of stator windings is connected together by the connection ring 202 as shown in FIG. 1. The stator core is formed of suitable magnetic materials. The stator core is able to conduct magnetic flux and provide mechanical support for the plurality of stator windings. In this disclosure, the terms of stator winding, phase winding and phase conductor are usually interchangeable and usually have the same meaning. Depending on the construction of the motor, a phase winding or phase conductor may be located in the rotor also, although the following discussion will generally use such windings in the stator as examples. Throughout the description, the motor system shown in FIG. 1 may be alternatively referred to as a reconfigurable motor system.

Figure 2:
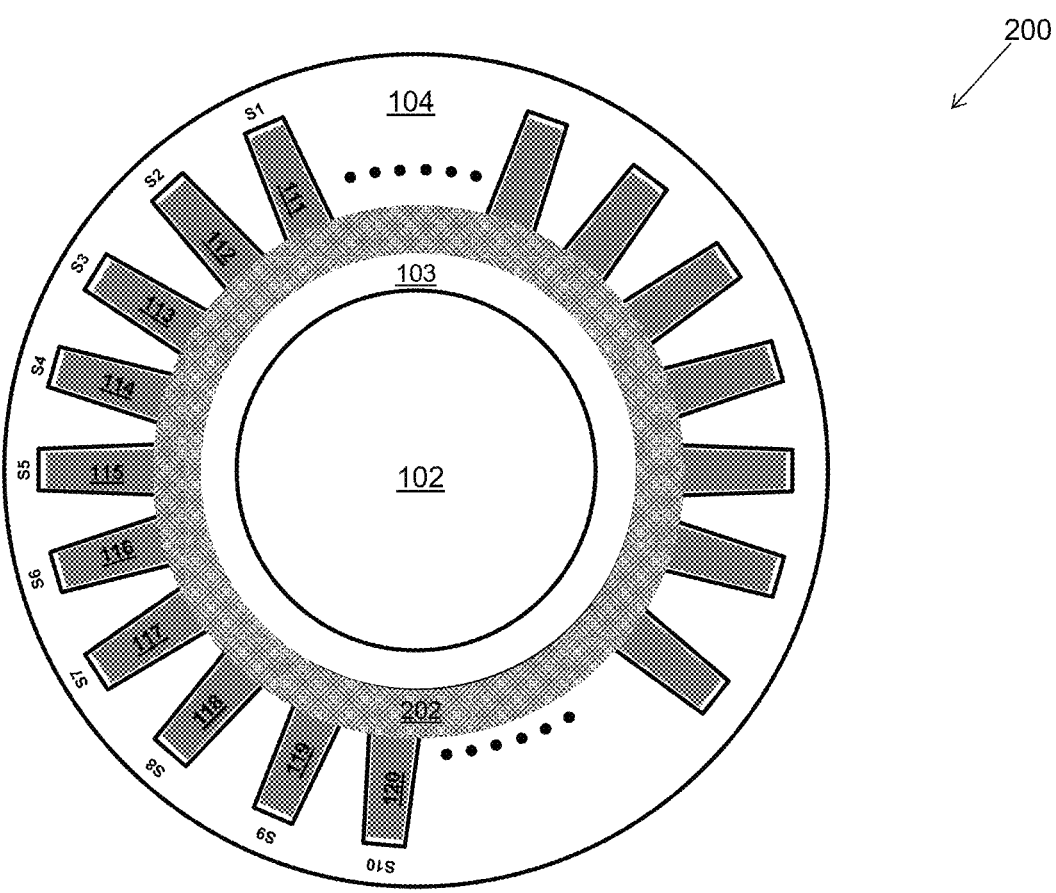
FIG. 2 illustrates a simplified view of the motor system shown in FIG. 1 in accordance with various embodiments of the present disclosure.

FIG. 2 illustrates a simplified view of the motor system shown in FIG. 1 in accordance with various embodiments of the present disclosure. The reconfigurable motor system 200 comprises the rotor 102, the stator 104 and a plurality of phase conductors formed in the stator 104. As shown in FIG. 2, there is an air gap 103 formed between the rotor 102 and the stator 104. A plurality of slots S1-S10 is formed in the stator 104. Each slot (e.g., slot S1) is employed to accommodate one stator winding comprising a phase conductor (e.g., stator winding 111). It should be noted, depending on different designs, more stator windings may be embedded in one slot. As shown in FIG. 2, there may be a plurality of stator windings 111-120 formed in the stator 104. Throughout the description, the stator winding may be alternatively referred to as the phase conductor of the stator.

It should be recognized that while FIG. 2 illustrates the motor system 200 with few slots and stator windings, the motor system 200 could accommodate any number of slots and stator windings. The slots are generally evenly distributed along a perimeter of the motor, and are labeled consecutively. Throughout the description in the present disclosure, the slot and the winding in the slot are generated designated with the same number. For example, S5 shown in FIG. 2 may means the 5th slot or the phase conductor (winding) embedded in the 5th slot, depending on the context of the description.

FIG. 2 further illustrate the connection ring 202. Throughout the description, the connection ring 202 may be alternatively referred to as a ring. As shown in FIG. 2, the ring 202 is placed on one end of the stator 104. The ring 202 is formed of a suitable conductive material. The ring 202 is employed to connect the stator windings together. As shown in FIG. 2, each stator winding has one end connected to the ring 202. The ring 202 allows the currents of all stator windings to be controlled.

It should be noted that the sum of the currents flowing through the stator windings should be equal to zero if the ring 202 is not connected to other nodes of the motor system. If the sum of the currents flowing through the stator windings is not equal to zero, a conductive path should be provided as a return path for the unbalanced currents. The detailed implementations of the return path will be discussed below with respect to FIGS. 12-15.

As shown in FIG. 2, the ring 202 is circular in shape. It should further be noted that the shape of the ring 202 is merely an example. One of ordinary skill in the art would recognize many variations, alternatives, and modifications. For example, it is within the scope and spirit of the disclosure for the ring 202 to comprise other shapes, such as, but not limited to oval, square or rectangle. Throughout the description, the ring may be alternatively referred to as a connection ring or a connection bar.

Figure 3:
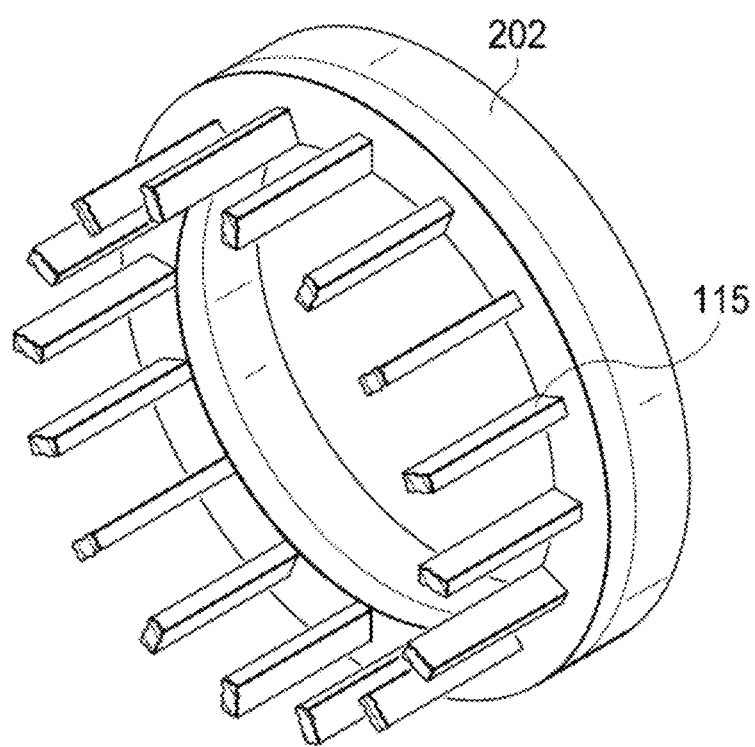
FIG. 3 illustrates a perspective view of the connection ring and the plurality of stator windings of the motor system shown in FIG. 2 in accordance with various embodiments of the present disclosure.

FIG. 3 illustrates a perspective view of the connection ring and the plurality of stator windings of the motor system shown in FIG. 2 in accordance with various embodiments of the present disclosure. The connection ring 202 is circular in shape. One end of each stator winding (e.g., stator winding 115) is connected to the connection ring 202. Since the connection ring 202 is formed of a conductive material. The plurality of stator windings is electrically connected to each other. In the manufacturing process, a phase conductor may be inserted into a slot of a motor as a component. Alternatively, the phase conductor may be manufactured into the slot through suitable processes such as molding, casting, plating or printing processes using a conductive material, separately or together with other phase conductors. The end ring may be manufactured together with the conductors, or separately and then connected to the phase windings afterwards.

In some embodiments, the phase conductor connected to the connection ring 202 is inserted into an opening of the connection ring 202. Alternatively, the end of the phase conductor connected to the connection ring 202 may be connected to the top surface or protruding regions of the connection ring 202. The plurality of stator windings may be connected to the connection ring 202 through various processes such as welding, soldering and the like. The detailed connection diagrams will be described below with respect to FIG. 9.

Figure 4:
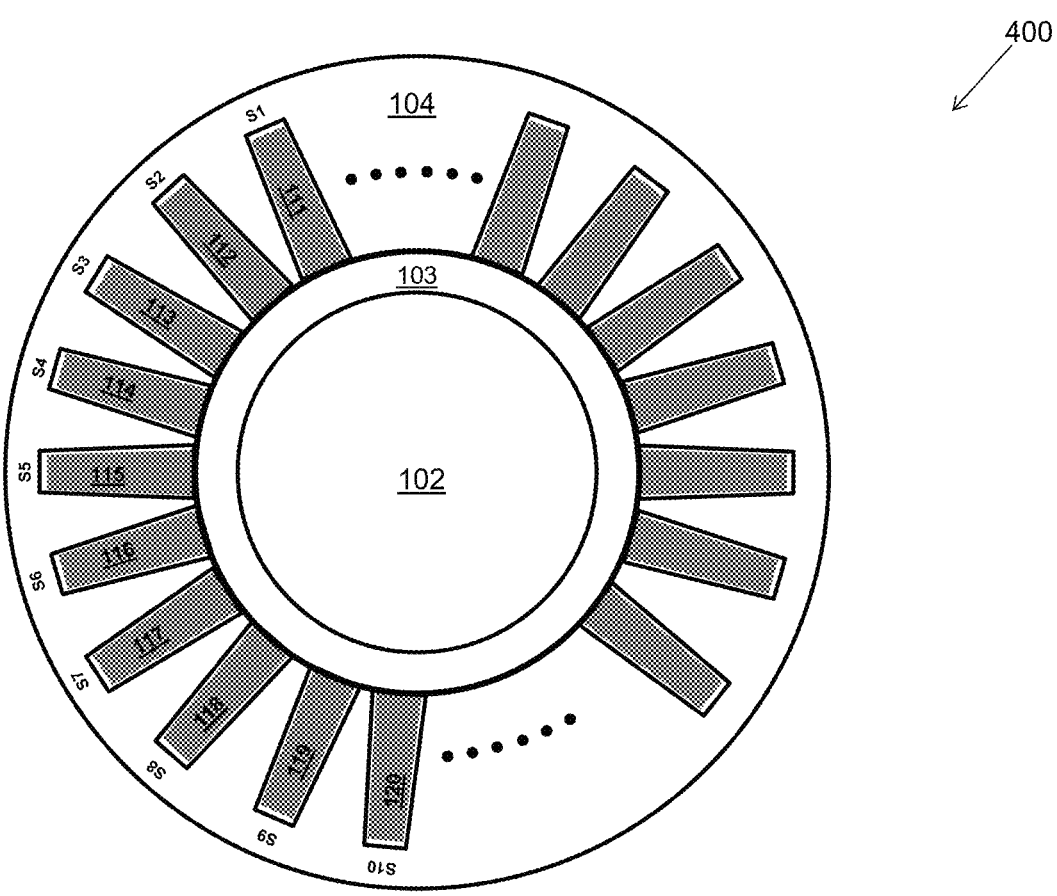
FIG. 4 illustrates a simplified view of another motor system in accordance with various embodiments of the present disclosure.

FIG. 4 illustrates a simplified view of another motor system in accordance with various embodiments of the present disclosure. The motor system 400 is similar to the motor system 200 shown in FIG. 2 except that the ring 202 is not placed on one end of the stator 104. The interconnection of the stator windings may be made through other methods.

Figure 5:
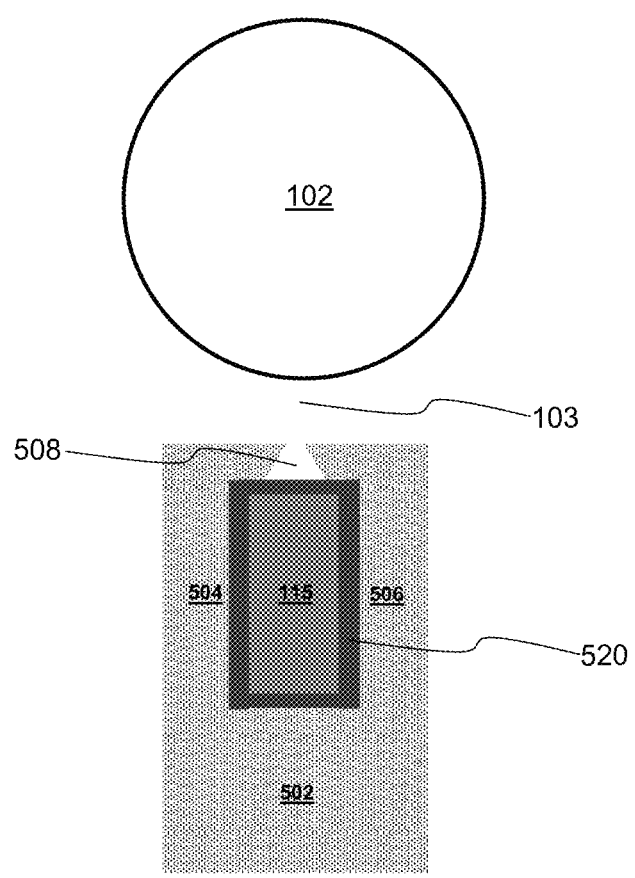
FIG. 5 illustrates a cross sectional view of an area around a stator slot taken along line A-A' in FIG. 1 in accordance with various embodiments of the present disclosure.

FIG. 5 illustrates a cross sectional view of an area around a stator slot taken along line A-A' in FIG. 1 in accordance with various embodiments of the present disclosure. A region 502 is a portion of the stator core called a yolk or s base. A first tooth 504 and a second tooth 506 are formed over the region 502. The region 502 and the teeth 504, 506 are called the core of the stator. The region 502 and the teeth 504, 506 are formed of a magnetic material such as a silicon steel laminate, a ferrite block, or a magnetic compound. A trench 508 is over the region 502 and between the first tooth 504 and the second tooth 506. The trench 508 is alternatively referred to as a slot. The sidewalls and the bottom of the trench may be coated with an insulation layer 520 to withstand a relatively high voltage.

The phase conductor 115 is embedded in the trench. There is usually an insulation layer 520 formed between the phase conductor 115 and the core of the stator if the conductor needs to withstand a relatively high voltage. Over the phase conductor 115, there is usually an opening that is sometimes filled with a mechanical support material, which may or may not be a magnetic-conducting material. In some embodiments, suitable materials such as solder paste may be filled in the slot 508. After a reflowing process, the solder paste forms a cap to further secure the stator winding's position.

As shown in FIG. 5, the stator and the rotor 102 are separated by the air gap 103. For brevity, only one stator winding (e.g., phase conductor 115) has been illustrated in FIG. 5. A person skilled in the art would understand the rotor 102 is surrounded by a plurality of stator windings.

Figure 6:
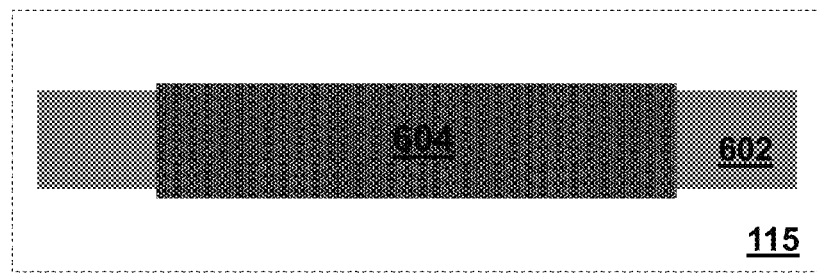
FIG. 6 illustrates a detailed view of the stator winding in accordance with various embodiments of the present disclosure.

FIG. 6 illustrates a detailed view of the stator winding in accordance with various embodiments of the present disclosure. The stator winding 115 comprises a metal bar 602, and optionally an insulation layer 604 may be formed over the middle portion of the metal bar 602 which is embedded in a slot. The metal bar 602 may be formed of any suitable conductive materials such as aluminum, steel, copper, any combinations thereof and the like.

There may be a variety of processes to form the insulation layer 604 with a suitable insulation material. In some embodiments, in order to increase the insulation voltage of the stator winding 115, part of the stator winding 115 located inside the stator may be coated or covered with suitable insulation materials such as insulation paper, film or paint. In some embodiments, an oxidation process is applied to the metal bar and an oxidized layer is formed. The oxidized layer is an insulation layer. During the oxidation process, the areas to be used for the electrical connection are not oxidized. Through suitable oxidation processes, the oxidized layer around the surface of the metal bar can stand a high voltage enough for the reconfigurable motor applications.

The insulation layer may also provide a good thermal conduction path so that heat can be transferred between the stator winding and the magnetic material adjacent to the stator winding. It should be noted that, depending on different applications and design needs, the conductors and the connection bar can be casted or molded as a single piece.

Figure 7:
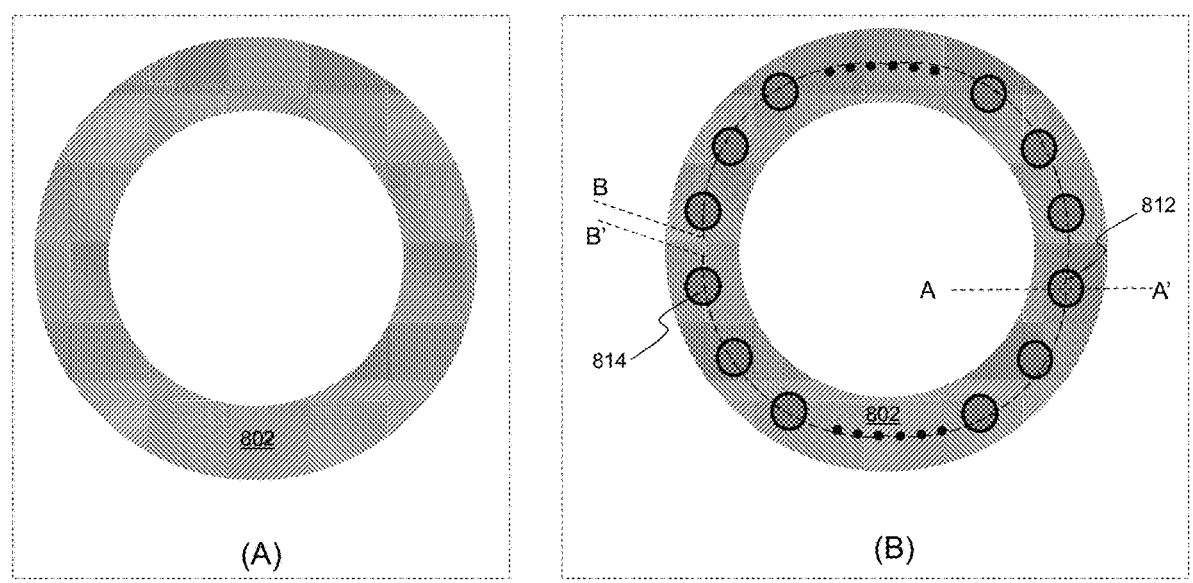
FIG. 7 illustrates side views of the connection ring in accordance with various embodiments of the present disclosure.

FIG. 7 illustrates side views of the connection ring in accordance with various embodiments of the present disclosure. FIG. 7 includes FIG. 7(A) and FIG. 7(B). FIG. 7(A) shows a connection ring 802, which is similar to the connection 202 shown in FIG. 1. FIG. 7(B) illustrates a plurality of openings formed in the connection ring 802. Throughout the description, FIG. 7(A) and FIG. 7(B) may be collectively referred to as FIG. 7.

The connection ring 802 is formed of a conductive material. The connection ring 802 may comprise a plurality of openings for accommodating the stator windings, and each opening works as a connecting port to accommodate an end of a conductor. As shown in FIG. 7(B), the connection ring 802 comprises many openings such as openings 812 and 814. The openings 812 and 814 may be circular in shape. The openings may be evenly spaced in the connection ring 802 as shown in FIG. 7(B). The detailed connection between the connection ring 802 and the stator windings will be described below with respect to FIG. 9.

It should be noted that the shape of the openings is merely an example. One of ordinary skill in the art would recognize many variations, alternatives, and modifications. For example, it is within the scope and spirit of the disclosure for the openings to comprise other shapes, such as, but not limited to oval, square or rectangle. Furthermore, depending on different applications and design needs, the openings may be not evenly spaced.

Figure 8:
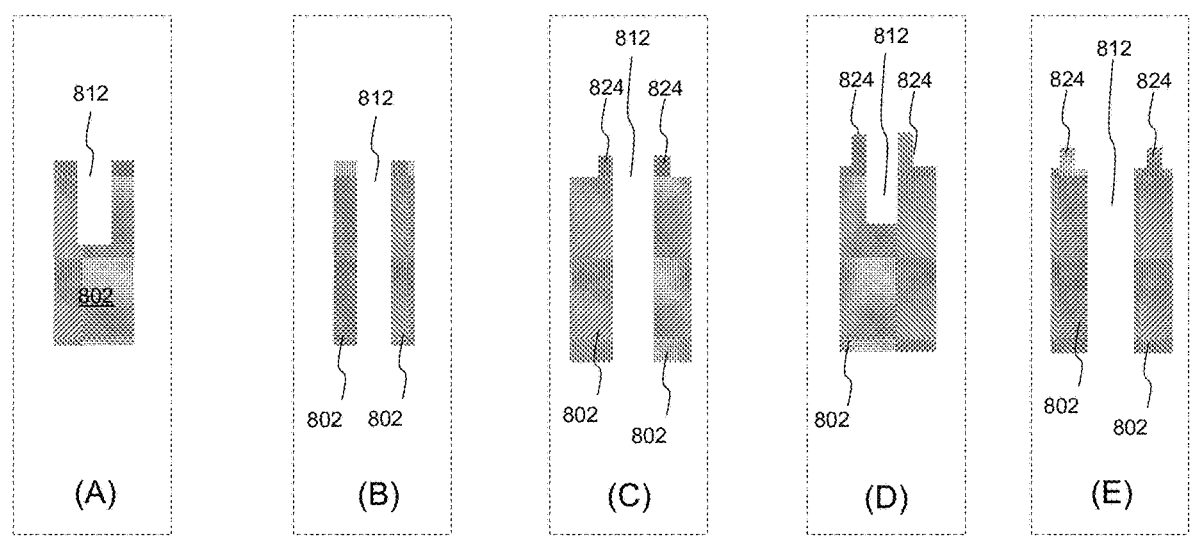
FIG. 8 illustrates cross sectional views of the connection ring taken along line A-A' in FIG. 7 in accordance with various embodiments of the present disclosure.

FIG. 8 illustrates cross sectional views of the connection ring taken along line A-A' in FIG. 7 in accordance with various embodiments of the present disclosure. FIG. 8 includes FIGS. 8(A)-8(E). FIGS. 8(A)-8(E) illustrate various embodiments of the opening of the connection ring. Throughout the description, FIGS. 8(A)-8(E) may be collectively referred to as FIG. 8.

The connection ring 802 has an opening 812. The opening 812 is employed to accommodate a phase winding. In particular, one end of the phase winding is inserted into the opening. A suitable process such as welding or soldering may be used to secure the position of the phase winding. Alternatively, a mechanical lockdown device may be used to secure the position of the phase winding.

As shown in FIG. 8(A), the opening 812 may extend partially through the connection ring 802. Then, the opening 812 is a blind-hole opening. As shown in FIG. 8(B), the opening 812 may extend through the connection ring 802. In other words, the opening 812 is a through-hole opening.

In FIG. 8(C), one side of the connection ring 802 has a protruding region 824. The through-hole opening 812 extends through the protruding region 824 as well as the connection ring 802. In FIG. 8(D), one side of the connection ring 802 has a protruding region 824. The opening 812 extends partially through the connection ring 802. In FIG. 8(E), the opening is smaller in the main body of the connection ring 802 than in the protruding region 824. The opening arrangement shown in FIG. 8(E) helps to secure the position of the phase winding to be inserted in the opening. The opening arrangement shown in FIG. 8(E) may improve the soldering process for connecting the conductors and the connection ring.

The protruding regions and the opening shown in FIG. 8 can both work as a connecting port to receive an end of a conductor, and may be combined in various ways. For example, it is feasible to place the protruding regions on both the top surface and the bottom surface of the connection ring 802. The use of the protruding region shown in FIG. 8 may improve the manufacturing process so as to increase the soldering quality, mechanical strength and current capability of the connection.

In some embodiments, before or after inserting the phase conductor into the opening (e.g., opening 812), a solder or welding material layer may be put at the bottom of the opening or along the wall of the opening. After the phase conductor has been inserted into the opening, suitable processes such as a reflow soldering, hand soldering, laser soldering, wave soldering, welding and the like may be used to secure the connection between the phase conductor and the connection ring.

It should be noted the depth of the openings shown in FIG. 8 is merely an example. Depending on different applications and design needs, the depth of the openings may vary accordingly.

Figure 9:
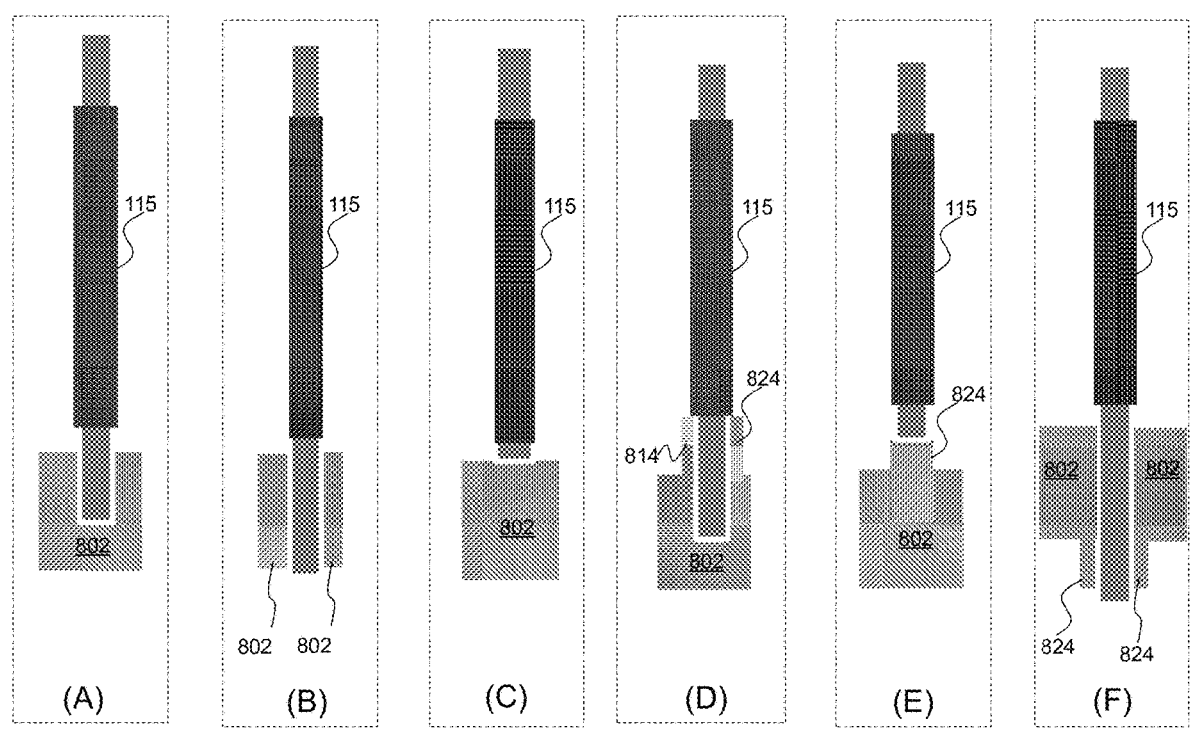
FIG. 9 illustrates side views after a conductor is connected to the connection ring in accordance with various embodiments of the present disclosure.

FIG. 9 illustrates side views after a conductor is connected to the connection ring in accordance with various embodiments of the present disclosure. FIG. 9 includes FIGS. 9(A)-9(F). FIGS. 9(A)-9(F) illustrate various embodiments of the connection between the winding and the connection ring. Throughout the description, FIGS. 9(A)-9(E) may be collectively referred to as FIG. 9.

The phase conductors may be connected with the connection ring through a variety of implementations as shown in FIG. 9. In a first implementation exemplified by FIG. 9(A), the phase conductor 115 may be connected to the connection ring through an opening extending partially through the connection ring 802. In a second implementation, as is shown in FIG. 9(B), the phase conductor 115 may be connected to the connection ring 802 through an opening extending through the connection ring 802. An end of the phase conductor may extend partially or totally through the opening.

In a third implementation as shown in FIG. 8(C), the phase conductor 115 may be connected to the top surface of the connection ring 802 directly. In a fourth implementation as shown in FIG. 8(D), the phase conductor 115 may be connected to a protruding region 824 of the connection ring 802 through an opening formed in the protruding region 824 as well as the main body of the connecting ring 802. The opening may be a through-hole opening or a blind-hole opening.

In a fifth implementation as is shown in FIG. 8(E), the phase conductor 115 may be connected to a protruding region 824 of the connection ring 802 on the surface of the protruding region 824. In a sixth implementation as is shown in FIG. 8(F), the phase conductor 115 may be connected to the connection ring 802 through a through-hole opening on a protruding region 824, where the protruding region 824 is coupled to the bottom surface of the connection ring 802. Again, the use of the protruding region may improve the manufacturing process, the mechanical strength and/or current capability of the connection. It should be noted that these implementations can be used separately or in combination depending on design needs and different applications.

Figure 10:
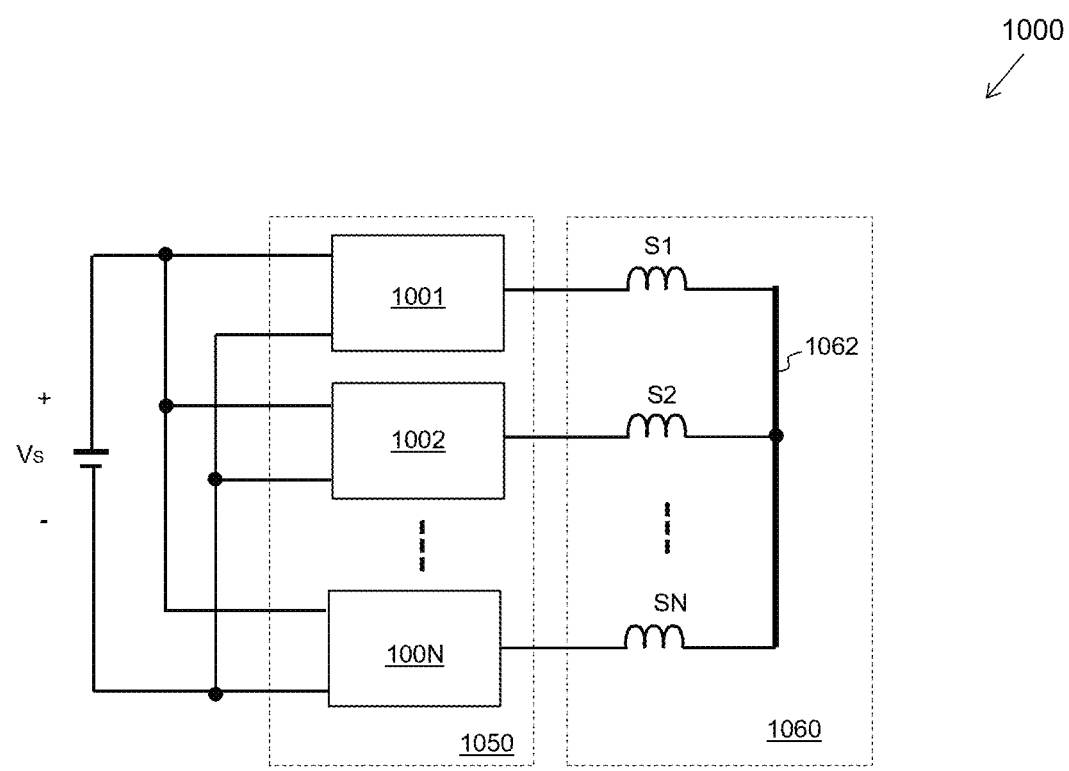
FIG. 10 illustrates a block diagram of a reconfigurable motor system in accordance with various embodiments of the present disclosure.

FIG. 10 illustrates a block diagram of a reconfigurable motor system in accordance with various embodiments of the present disclosure. The reconfigurable motor system 1000 comprises a reconfigurable motor 1060 and the associated power converter group 1050. In some embodiments, the reconfigurable motor 1060 can be implemented as the reconfigurable motor shown in FIG. 2. In alternative embodiments, the reconfigurable motor 1060 can implemented as any reconfigurable motor. As shown in FIG. 10, the reconfigurable motor 1060 comprises a plurality of stator windings S1-SN and a connection ring 1062.

The power converter group 1050 comprises a plurality of power converters 1001-100N. Each power converter (e.g., power converter 1001) has an input connected the power source Vs and an output connected a corresponding stator winding (e.g., stator winding S1). As shown in FIG. 10, a first end of the stator winding (e.g., stator winding S1) is connected to the output of the corresponding power converter (e.g., power converter 1001). A second end of the stator winding is connected to the connection ring 1062. The structure of the power converter will be described in detail below with respect to FIG. 11.

Figure 11:
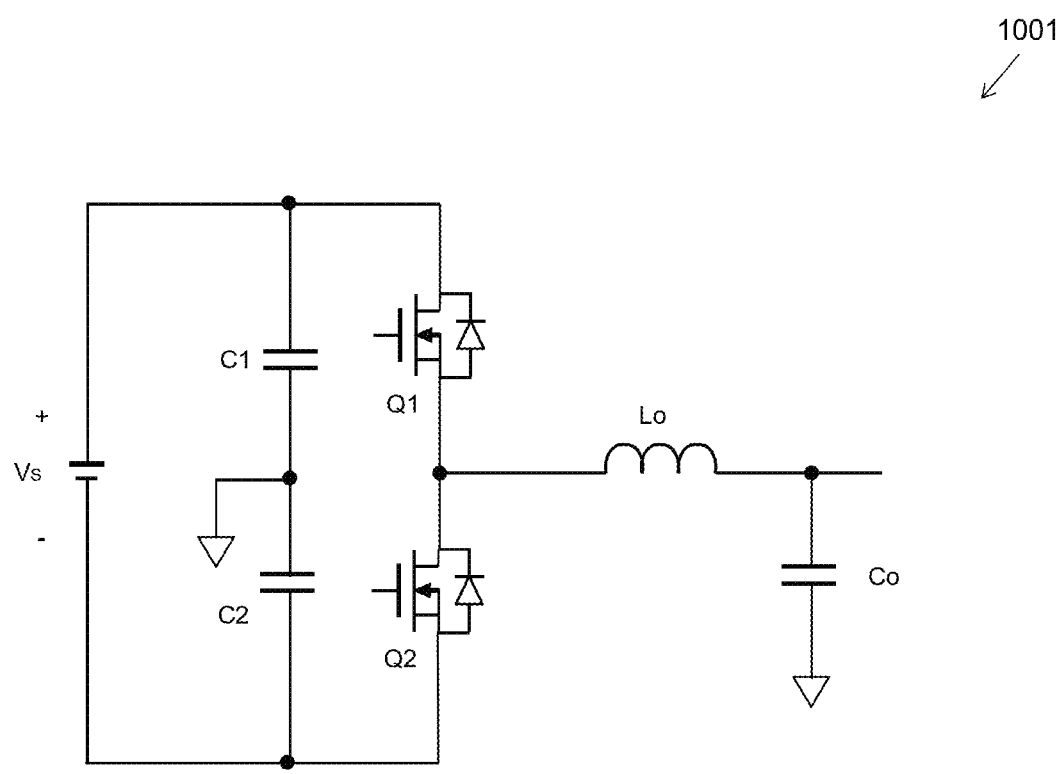
FIG. 11 illustrates a schematic diagram of a power converter suitable for using in the system shown in FIG. 10 in accordance with various embodiments of the present disclosure.

FIG. 11 illustrates a schematic diagram of a power converter suitable for using in the system shown in FIG. 10 in accordance with various embodiments of the present disclosure. In some embodiments, the power converter 1001 is implemented as a half-bridge power converter. The half-bridge power converter 1001 includes two switching elements, namely Q1 and Q2, and two capacitors, namely C1 and C2.

As shown in FIG. 11, the switching elements Q1 and Q2 are connected in series between the output terminals of the power source Vs Likewise, the capacitors C1 and C2 are connected in series between the output terminals of the power source Vs. The common node of the switching elements Q1 and Q2 is coupled to an input of an L-C filter formed by an inductor Lo and an output capacitor Co as shown in FIG. 11. The common node of the capacitors C1 and C2 is coupled to ground. Please note that Lo and Co are optional, and the common node of Q1 and Q2 may be directly connected to a conductor of the motor.

According to some embodiments, the switching elements Q1 and Q2 are implemented as MOSFET or MOSFETs connected in parallel, any combinations thereof and/or the like. According to alternative embodiments, the switching elements (e.g., switch Q1) may be an insulated gate bipolar transistor (IGBT) device. Alternatively, the switching elements can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a half-bridge converter (e.g., half-bridge converter 1001 shown in FIG. 11), the implementation of the power converter shown in FIG. 11 may have many variations, alternatives, and modifications. For example, full-bridge converters, push-pull converters and inductor-inductor-capacitor (LLC) resonant converters may be alternatively employed in some suitable applications.

In sum, the half-bridge converter 1001 illustrated herein is limited solely for the purpose of clearly illustrating the inventive aspects of the various embodiments. The present invention is not limited to any particular power topology.

It should further be noted that while FIG. 11 illustrates two switches Q1 and Q2, various embodiments of the present disclosure may include other variations, modifications and alternatives. For example, a separate capacitor may be connected in parallel with each switch of the half-bridge converter 1001. Such a separate capacitor helps to better control the timing of the resonant process and EMI of the half-bridge converter 1001.

Figure 12:
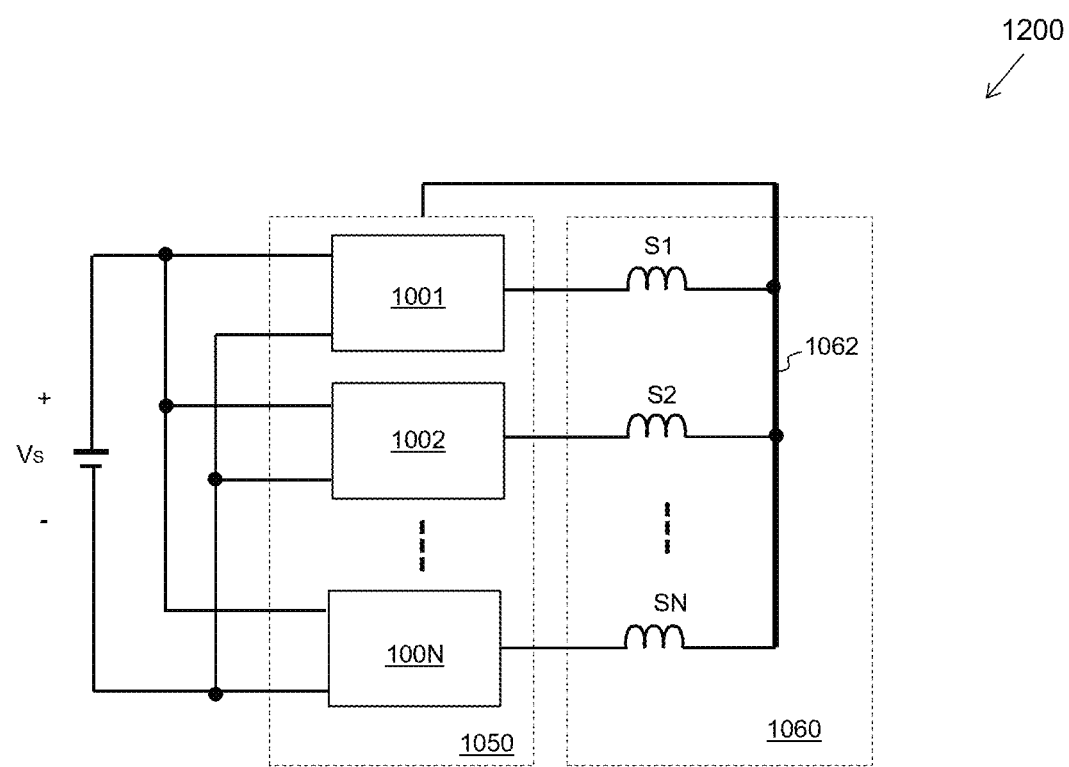
FIG. 12 illustrates a block diagram of another reconfigurable motor system in accordance with various embodiments of the present disclosure.

FIG. 12 illustrates a block diagram of another reconfigurable motor system in accordance with various embodiments of the present disclosure. The reconfigurable motor system 1200 shown in FIG. 12 is similar to the reconfigurable motor system 1000 shown in FIG. 10 except that the connection ring 1062 is coupled to the power converter group 1050 through a conductive path. In some embodiments, the connection ring 1062 may be connected to the power source Vs through a conductive path, in which there may be some impedance elements such as a capacitor or inductor between the connection ring and the power source. The connection shown in FIG. 12 helps to better control the currents flowing through the stator windings S1-SN. Especially, when the sum of the currents flowing through the stator windings S1-SN is not equal to zero, the conductive path shown in FIG. 12 functions as a return path for the unbalanced currents flowing through the stator windings S1-SN.

In some embodiments, the connection ring 1062 may be not circular in shape. For example, there may be one gap or more gaps in the connection ring (not shown but illustrated in FIG. 21). In order to pursue better performance, the connection point between the return path and the connection ring 1062 may be located at the middle portion of the connection ring 1062.

Figure 13:
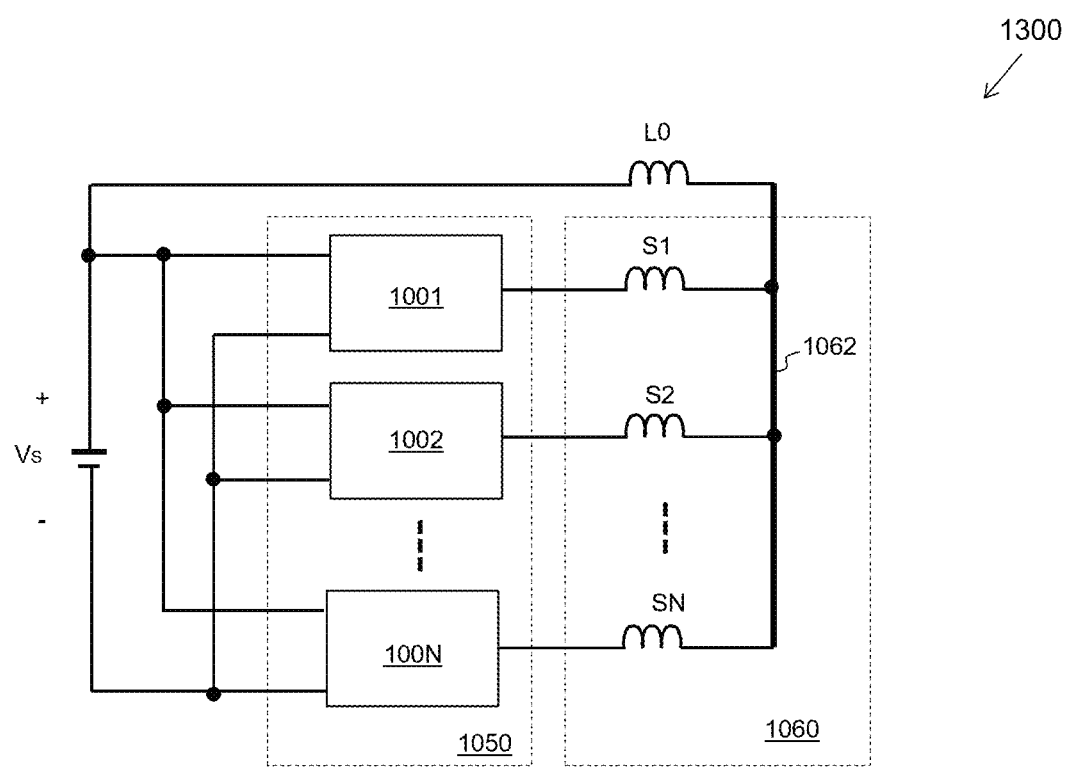
FIG. 13 illustrates a block diagram of another reconfigurable motor system in accordance with various embodiments of the present disclosure.

FIG. 13 illustrates a block diagram of another reconfigurable motor system in accordance with various embodiments of the present disclosure. The reconfigurable motor system 1300 is similar to the reconfigurable motor system 1200 shown in FIG. 12 except that an inductor L0 is connected between the connection ring 1062 and a positive terminal of the power source Vs. One advantageous feature of having the inductor L0 is the inductor L0 may help to reduce the current ripple in the stator windings. The inductor L0 also helps to filter switching noise from the power converters 1001-100N.

It should be noted that the inductor L0 may be integrated with the stator core of the reconfigurable motor system 1300. In some embodiments, the stator core may comprise magnetic conducting materials such as silicon steel, soft ferrite, any combinations thereof and the like. The inductor L0 may be formed in the stator core. For example, the inductor L0 is implemented as a conductor wound around a portion of the stator core of the reconfigurable motor system 1300.

Figure 14:
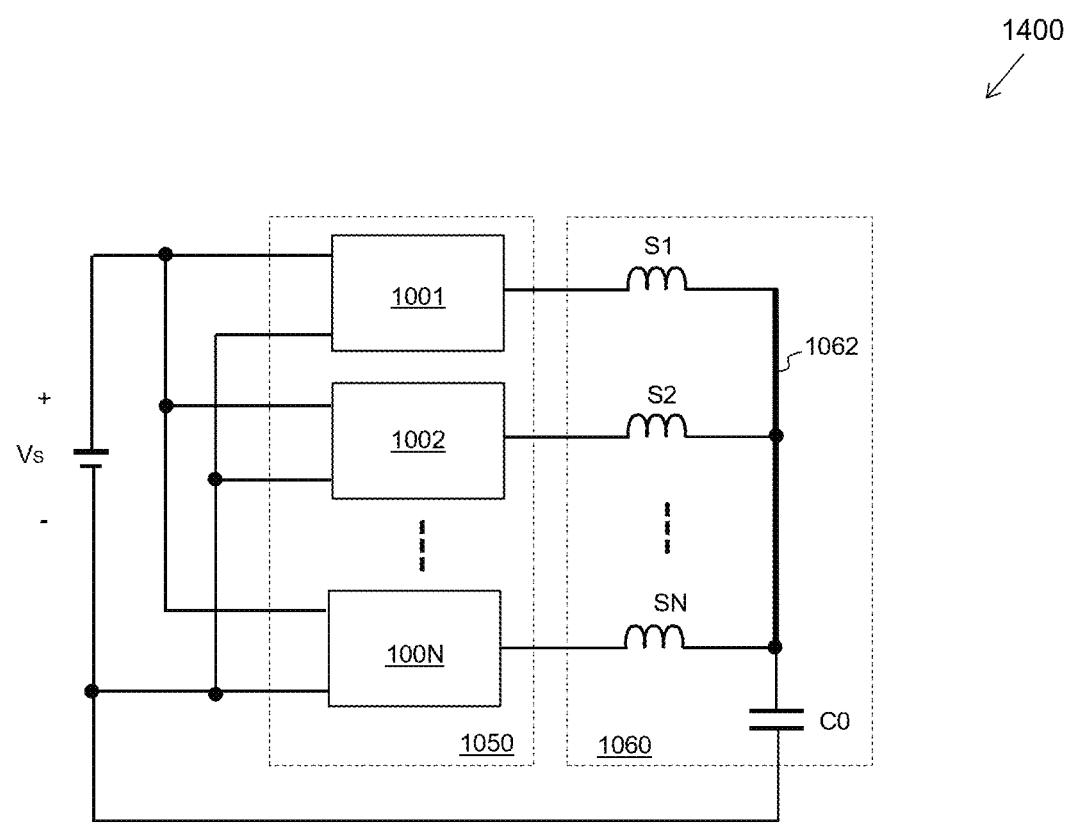
FIG. 14 illustrates a block diagram of another reconfigurable motor system in accordance with various embodiments of the present disclosure.

Although Lo is shown to be coupled to the positive terminal of the power source Vs, it can also be coupled to the negative terminal of the power source Vs or other nodes in the system with a stable voltage potential. In addition, L0 may be replaced by an impedance network with low resistance such as a capacitor or an inductor-capacitor network. FIG. 14 below shows an example.

FIG. 14 illustrates a block diagram of another reconfigurable motor system in accordance with various embodiments of the present disclosure. The reconfigurable motor system 1400 shown in FIG. 14 is similar to the reconfigurable motor system 1200 shown in FIG. 12 except that a capacitor is connected between the connection ring 1062 and a negative terminal of the power source Vs. One advantageous feature of having the capacitor C0 is the capacitor C0 may help to filter out the ac voltage and keep the connection ring 1062 having a stable voltage potential.

It should be noted that, depending design needs, other suitable components such as a protective fuse may be added into the conductive path. Furthermore, in order to avoid a significant parasitic inductance and the associated power losses, the connection wire in a conductive path should be placed outside the stator core of the reconfigurable motor system 1400 unless some inductance elements are needed in the connection wire.

Figure 15:
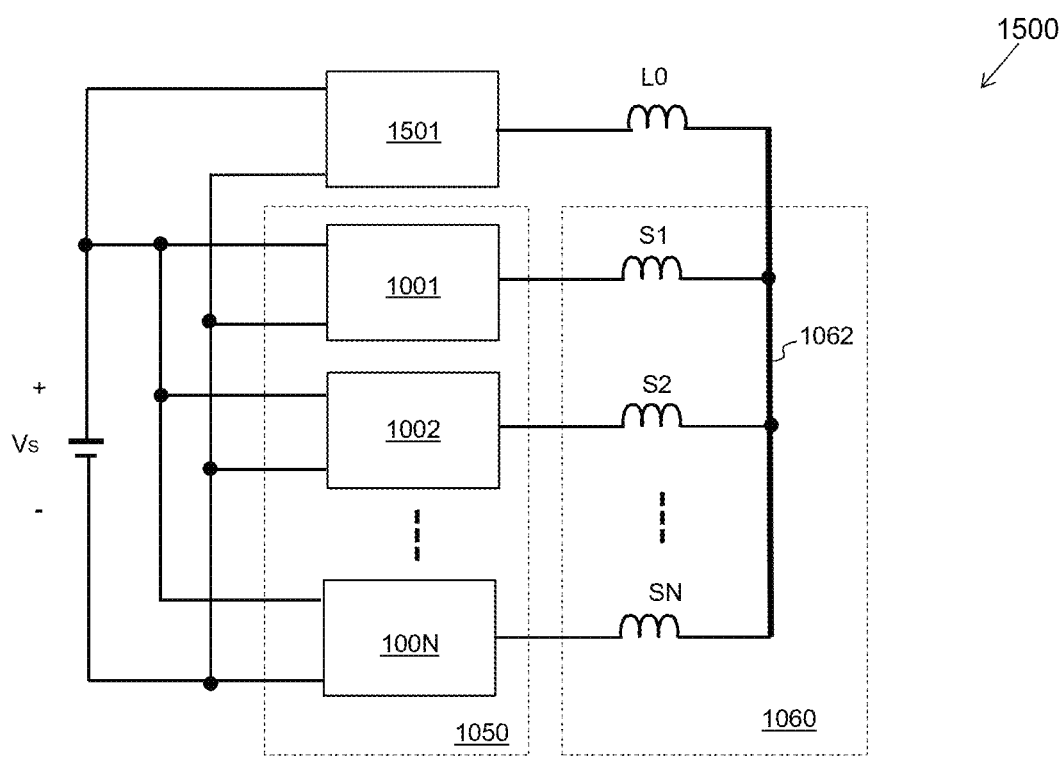
FIG. 15 illustrates a block diagram of another reconfigurable motor system in accordance with various embodiments of the present disclosure.

FIG. 15 illustrates a block diagram of another reconfigurable motor system in accordance with various embodiments of the present disclosure. The reconfigurable motor system 1500 is similar to the reconfigurable motor system 1500 shown in FIG. 13 except that a power converter 1501 is connected between the inductor L0 and the positive terminal of the power source Vs. The structure of the power converter 1501 is similar to the structure of the power converter 1001, and hence is not discussed herein.

One advantageous feature of having the power converter 1501 is the power converter 1501 may help to further improve the performance of the reconfigurable motor system 1500. For example, through controlling the operation of the power converter 1501, the unbalanced current on the connection ring 1062 may be controlled within a predetermined range.

The reconfigurable motor systems shown in FIGS. 10-15 may be configured to dynamically change the number of poles and number of phases of the motor through adjusting the phase angels of the winding currents and/or disabling the operation of certain windings through controlling the power converters. One of the key objectives of the motor system is to obtain the best system energy efficiency by coordinating the operation of the motor and the power converters through controlling the amplitude, frequency and phase angle of the motor phase currents (the currents flowing through the windings). As a result, a power loss of a key component in the system, or the combined power loss of the system including any combinations of the power converter loss, motor winding losses, motor magnetic material power losses and other losses, can be minimized over a wide range of operating conditions.

It is possible to operate the motor in a field-weakening mode over a wide range of operation conditions. As the magnetic power losses are heavily influenced by the strength of the magnetic field in the motor. In most conditions and/or applications, a motor doesn't need to operate at or near its rated torque. As such, both its flux strength and the amplitude of winding currents can be adjusted in response to its operating conditions.

In some embodiments, the power source may be implemented as a plurality of power sources connected in series. Alternatively, the power source may be of a high voltage potential. The power source applied to the reconfigurable motor system can be divided into several input voltage sources having a lower voltage rating. In response to the multiple input voltage sources divided from the power source, the phase windings may be divided into several groups. The phase windings in each group may be connected to a separate connection bar as well as coupled to a separate input voltage sources. This configuration (multiple winding groups, multiple connection bars and multiple input voltage sources) for high input voltage applications will be described below with respect to FIGS. 16-19.

Figure 16:
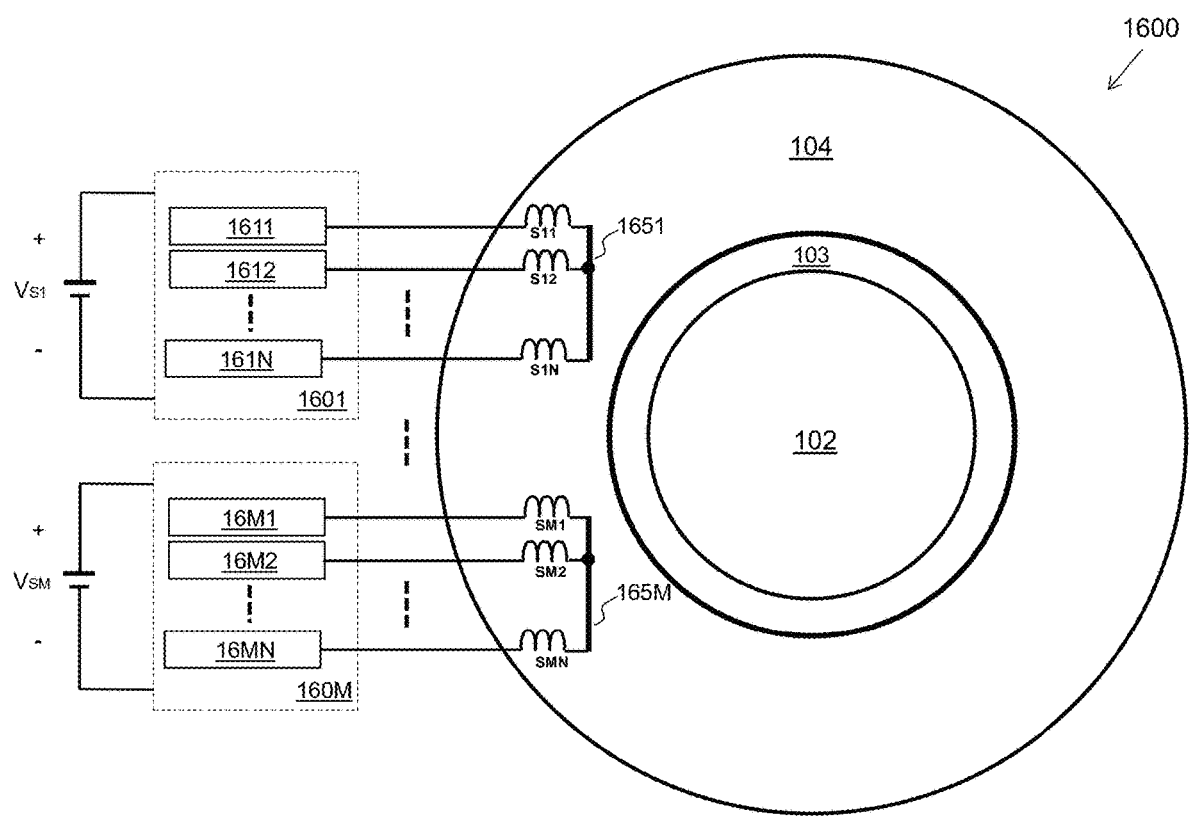
FIG. 16 illustrates a block diagram of a reconfigurable motor system having multiple winding groups in accordance with various embodiments of the present disclosure.

FIG. 16 illustrates a block diagram of a reconfigurable motor system having multiple winding groups in accordance with various embodiments of the present disclosure. The reconfigurable motor system 1600 comprises a stator 104, a rotor 102 and an air gap 103. The stator 104 comprises a plurality of stator windings. The plurality of stator windings may be embedded in the stator core. More particularly, the stator core may comprise a plurality of slots. Each slot is employed to accommodate one stator winding. Alternatively, depending on different applications and design needs, each slot may be employed to accommodate multiple stator windings. In addition, the reconfigurable motor system 1600 may not include a stator core (e.g., a coreless motor), or there is no slot in the stator core.

As shown in FIG. 16, the plurality of stator windings is divided into M groups, where M is a predetermined integer.

The stator windings of each group are connected by a connection ring. For example, the stator windings S11-S1N of the first group are connected by a first connection ring 1651 as shown in FIG. 16. Likewise, the stator windings SM1-SMN of the mth group are connected by an Mth connection ring 165M as shown in FIG. 16. In FIG. 16, the connection rings are shown floating (e.g., the connection rings are isolated from each other as shown in FIG. 16). In this disclosure, a connection ring may not be an enclosed shape, and thus can be a connection bar. If some of the M input power sources are isolated from each other, some of the connection rings 1651-165M may be electrically connected together, or form a single connection ring.

Furthermore, the reconfigurable motor system 1600 comprises a plurality of power converter groups. Each power converter group is connected between a power source and a corresponding stator winding group. As shown in FIG. 16, a first power converter group 1601 is connected between a first power source VS1 and the first group of the stator windings S11-S1N. The first power converter group 1601 comprises a plurality of power converters 1611-161N as shown in FIG. 16. Likewise, an Mth power converter group 160M is connected between a mth power source VSM and the mth group of the stator windings SM1-SMN. The Mth power converter group 160M comprises a plurality of power converters 16M1-16MN as shown in FIG. 16. In some embodiments, the plurality of power converters is divided into a plurality of power converter groups sequentially.

In some embodiments, the power sources VS1-VSM are separate power sources as shown in FIG. 16. In alternative embodiments, the power sources VS1-VSM are connected in series to accommodate a high input voltage applied to the reconfigurable motor system 1600. Furthermore, the power sources VS1-VSM may be developed from capacitors connected in series and coupled to a common power source. Thus, it may be important to achieve a charge balance among the power sources. In order to accomplish a charge balance of the power sources connected in series, it is desirable that the dc currents flowing in/out of the power sources are equal or approximately equal (e.g., within 20% tolerance) to each other.

In some embodiments, the power sources can perform efficiently and reliably when the current flowing through each power source is a dc current or a current having low low-frequency components. For example, the harmonic components (e.g., the fundamental and the low order harmonics) of the current should be reduced down to the minimum. In some embodiments, each winding group should have at least three stator windings evenly spaced in a pair of poles. The stator windings are configured to conduct currents with the same amplitude and frequency. Furthermore, the phase angles of the currents are evenly distributed among the stator windings. As a result, the stator windings in each winding group form a symmetrical and balanced multi-phase system, and the current flowing through each power source is a dc current in ideal operation.

Figure 17:
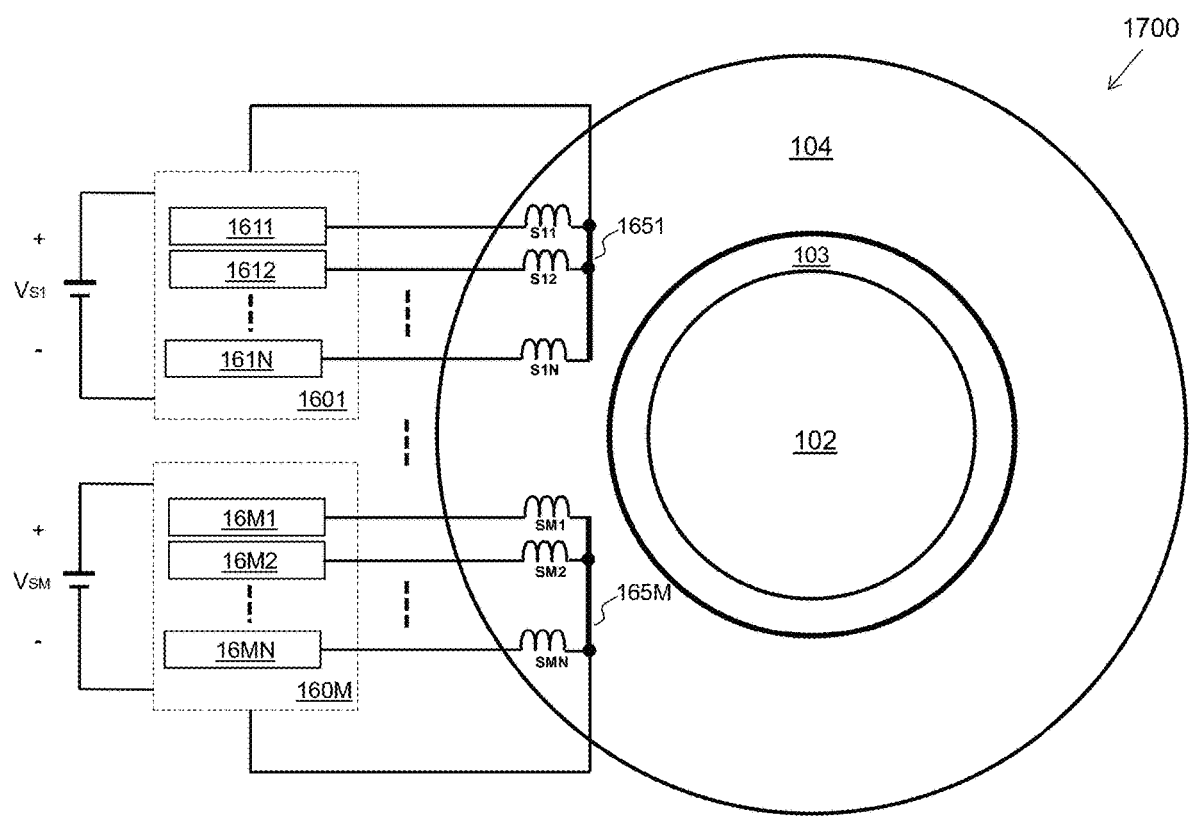
FIG. 17 illustrates a block diagram of another reconfigurable motor system having multiple winding groups in accordance with various embodiments of the present disclosure.

FIG. 17 illustrates a block diagram of another reconfigurable motor system having multiple winding groups in accordance with various embodiments of the present disclosure. The reconfigurable motor system 1700 is similar to the reconfigurable motor system 1600 shown in FIG. 16 except that a return path is connected to each stator winding group. The advantage of having a return path has been discussed above with respect to FIG. 12, and hence is not discussed again to avoid repetition.

Figure 18:
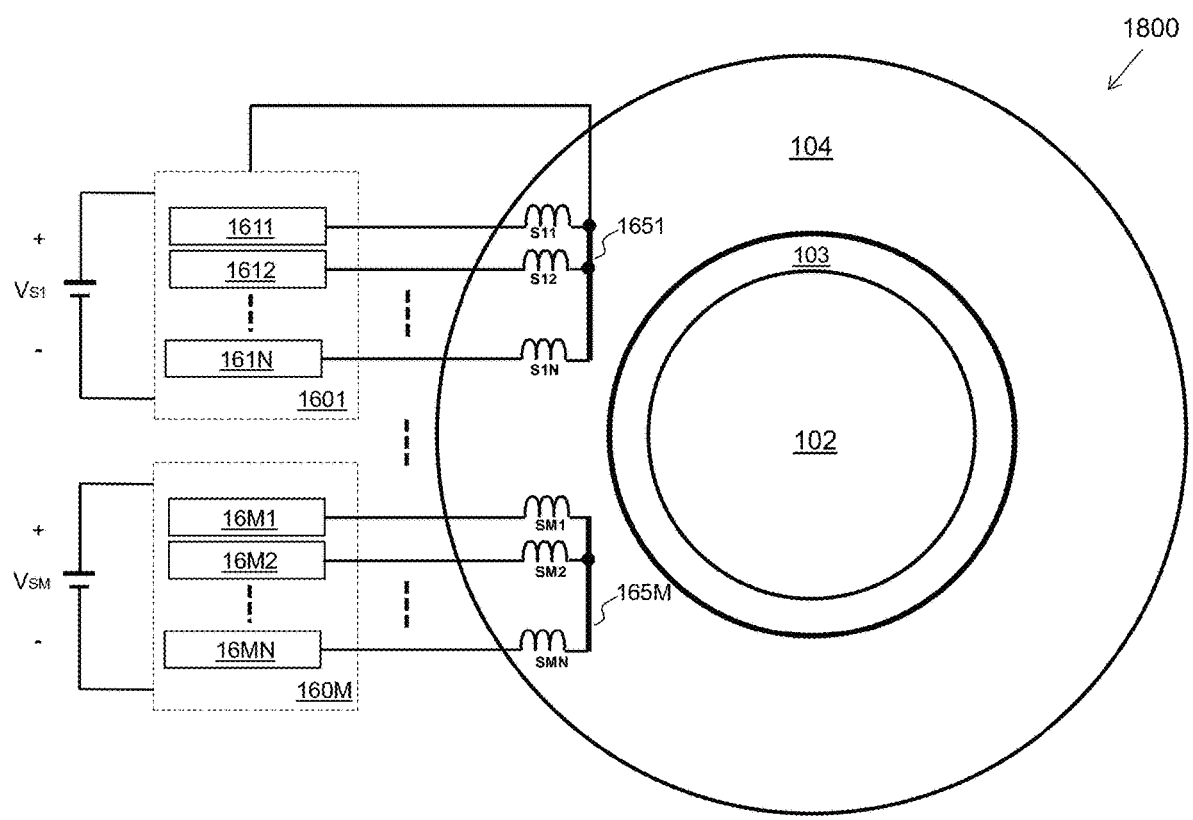
FIG. 18 illustrates a block diagram of yet another reconfigurable motor system having multiple winding groups in accordance with various embodiments of the present disclosure.

FIG. 18 illustrates a block diagram of yet another reconfigurable motor system having multiple winding groups in accordance with various embodiments of the present disclosure. The reconfigurable motor system 1800 is similar to the reconfigurable motor system 1600 shown in FIG. 16 except that a return path is connected to some stator winding groups. At least one stator winding group is not connected with a return path.

Figure 19:
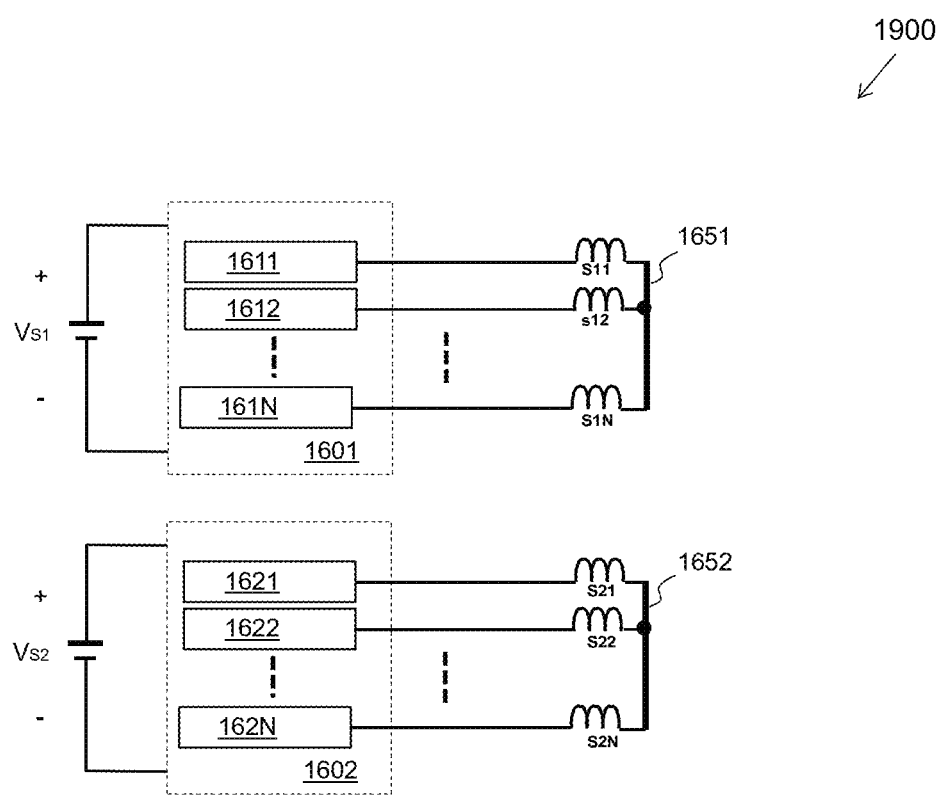
FIG. 19 illustrates a block diagram of a reconfigurable motor system having two winding groups in accordance with various embodiments of the present disclosure.

FIG. 19 illustrates a block diagram of a reconfigurable motor system having two winding groups in accordance with various embodiments of the present disclosure. The reconfigurable motor system 1600 shown in FIG. 16 has M winding groups. When the predetermined integer M is equal to two, the reconfigurable motor system 1600 shown in FIG. 16 becomes the reconfigurable motor system 1900 shown in FIG. 19.

As shown in FIG. 19, a first winding group comprises stator windings S11-S1N. The stator windings S11-S1N are connected together by a first connection ring 1651. A second winding group comprises stator windings S21-S2N. The stator windings S21-S2N are connected together by a second connection ring 1652. A first power converter group 1601 is connected between a first power source VS1 and the first group of the stator windings. The first power converter group 1601 comprises a plurality of power converters 1611-161N as shown in FIG. 19. Likewise, a second power converter group 1602 is connected between a second power source VS2 and the second group of the stator windings. The second power converter group 1602 comprises a plurality of power converters 1621-162N as shown in FIG. 19. If VS1 and VS2 are isolated from each other, the connection rings 1651 and 1652 may be connected electrically together, and in some embodiments may form one connection ring.

Figure 20:
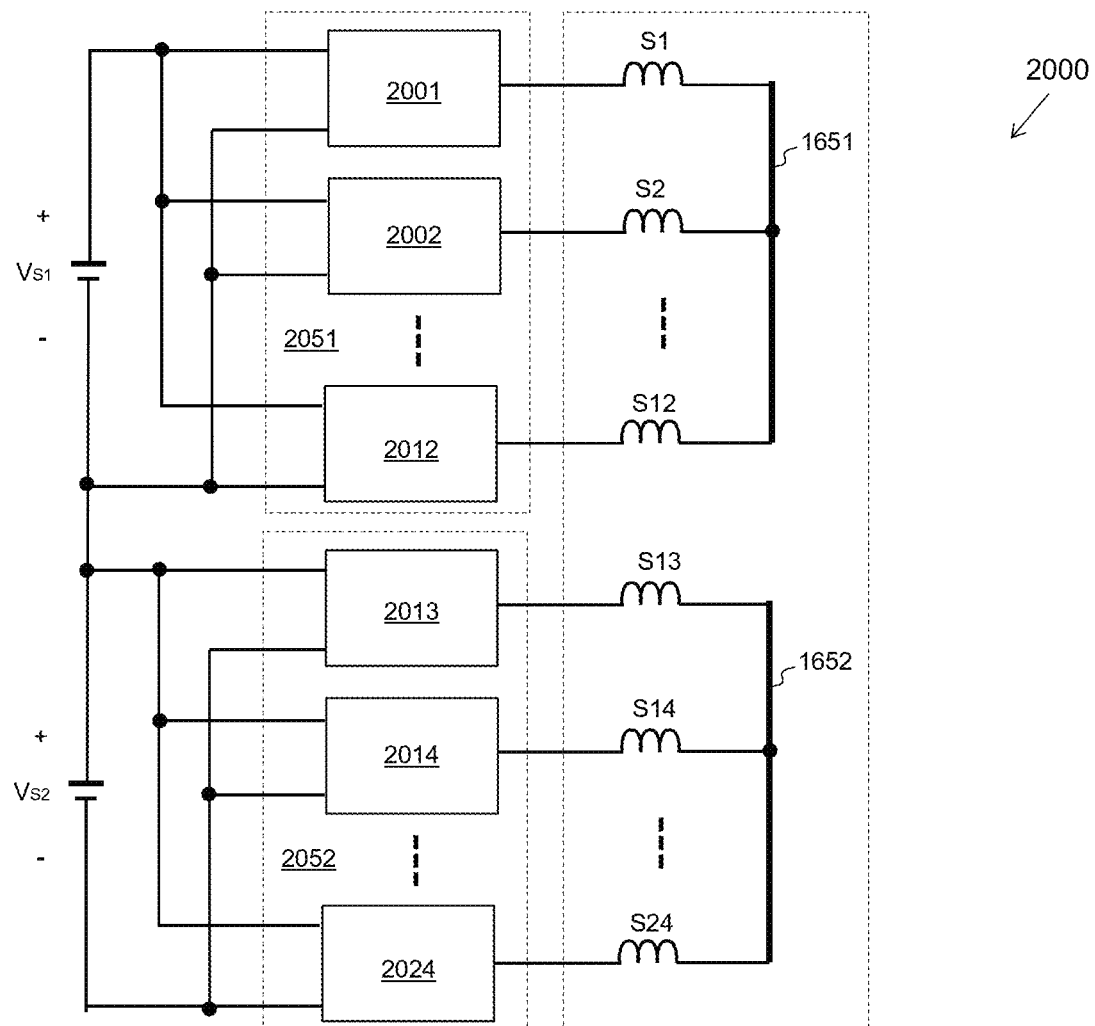
FIG. 20 illustrates a block diagram of another reconfigurable motor system having two winding groups in accordance with various embodiments of the present disclosure.

FIG. 20 illustrates a block diagram of another reconfigurable motor system having two winding groups in accordance with various embodiments of the present disclosure. The reconfigurable motor system 2000 is similar to the reconfigurable motor system 1900 shown in FIG. 19 except that each winding group comprises twelve windings in consecutive slots. As shown in FIG. 20, the first winding group comprises windings from S1 to S12. The second winding group comprises windings from S13 to S24. Similarly, each power converter group comprises twelve power converters, each of which is coupled to a stator winding as shown in FIG. 20.

As shown in FIG. 20, the first winding group comprises stator windings S1-S12. The second winding group comprises stator windings S13-S24. The first power converter group comprises power converters 2001-2012. The second power converter group comprises power converters 2013-2024.

It should be noted that the input power sources VS1 and VS2 are connected in series for enduring a high voltage applied to the reconfigurable motor system 2000.

Figure 21:
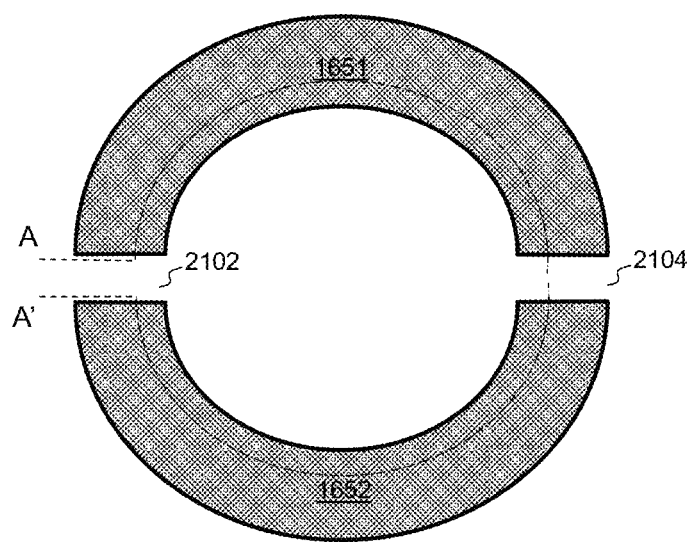
FIG. 21 illustrates a simplified view of a first implementation of the connection rings shown in FIG. 20 in accordance with various embodiments of the present disclosure.

FIG. 21 illustrates a simplified view of a first implementation of the connection rings shown in FIG. 20 in accordance with various embodiments of the present disclosure. Referring back to FIG. 7, the connection ring 202 may be circular in shape. The connection bars 1651 and 1652 shown in FIG. 21 can be formed by cutting portions of the connection ring 202. As shown in FIG. 21, by removing portions of the connection ring 202, a first gap 2102 and a second gap 2104 are formed between the two connection bars 1651 and 1652. As shown in FIG. 21, the first connection bar is a first semicircle arc, and the second connection bar is a second semicircle arc. As discussed earlier, a connection ring or a connection bar can be in a different shape also.

The connection bars 1651 and 1652 are formed of a conductive material. A plurality of first stator windings is electrically connected to each other through the first connection bar 1651. The plurality of first stator windings may be connected to the first connection bar 1651 through various processes such as welding and the like, or manufactured with the first connection bar in a single process. Likewise, a plurality of second stator windings is electrically connected to each other through the second connection bar 1652. The plurality of second stator windings may be connected to the second connection bar 1652 through various processes such as welding and the like, or manufactured with the second connection bar in a single process. The assignment between the stator windings and the connection bars will be described below with respect to FIGS. 22-23.

Figure 22:
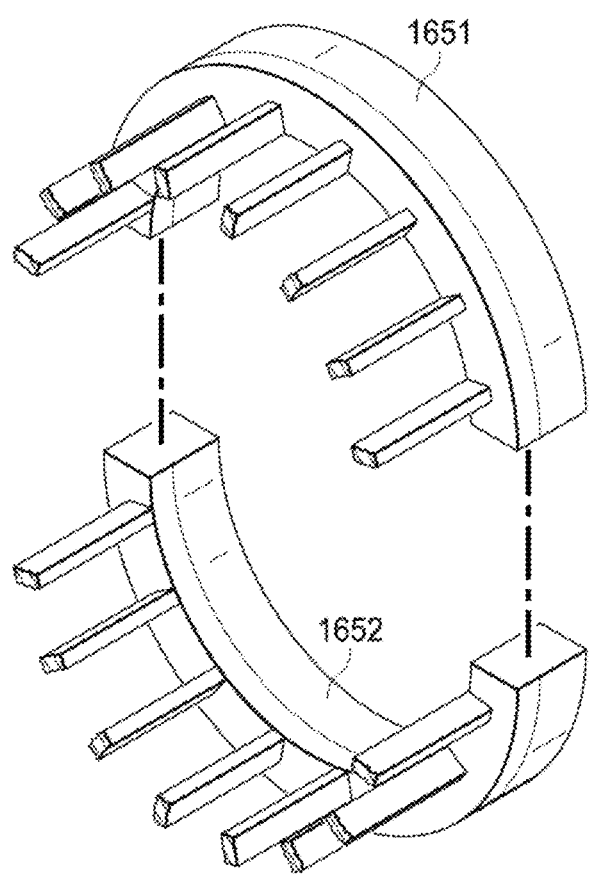
FIG. 22 illustrates a perspective view of the connection bars and the plurality of stator windings of the reconfigurable motor system shown in FIG. 20 in accordance with various embodiments of the present disclosure.

FIG. 22 illustrates a perspective view of the connection bars and the plurality of stator windings of the reconfigurable motor system shown in FIG. 20 in accordance with various embodiments of the present disclosure. The stator windings are divided into two groups. A first group of the stator windings are connected to the first connection bar 1651 though suitable processes such as welding and the like. A second group of the stator windings are connected to the second connection bar 1652 though suitable processes such as welding and the like.

It should be noted that the connection shown FIG. 22 is merely an example, which should not unduly limit the scope of the claims. One of ordinary skill in the art would recognize many variations, alternatives, and modifications. For example, the connection methods shown in FIG. 9 are applicable to the reconfigurable motor system having multiple connection bars/rings.

Figure 23:
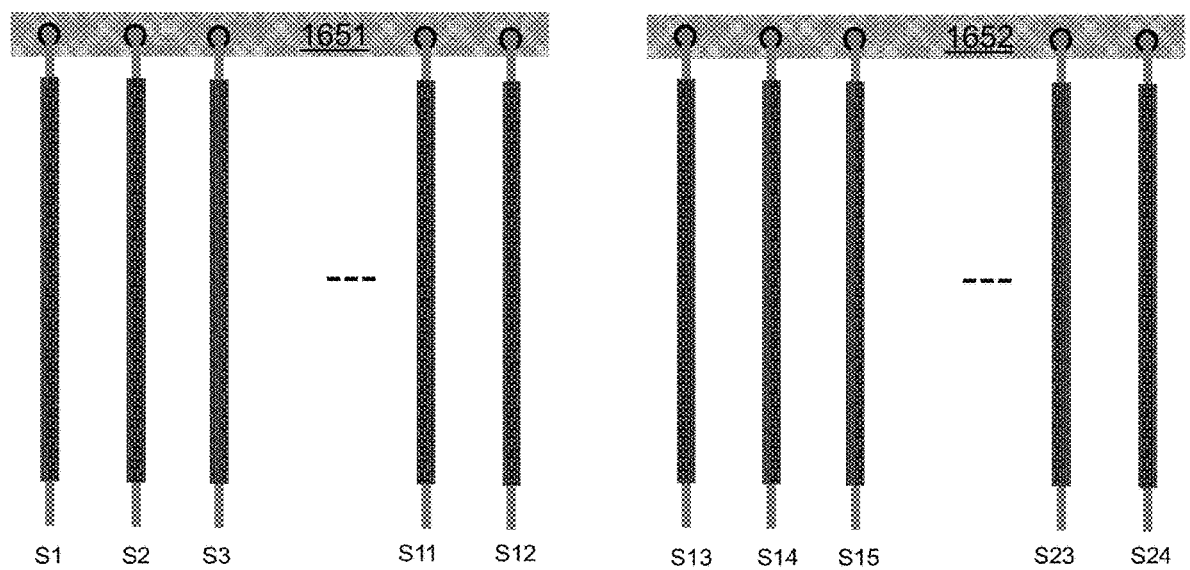
FIG. 23 illustrates an assignment of the plurality of stator windings to the connection bars in accordance with various embodiments of the present disclosure.

FIG. 23 illustrates an assignment of the plurality of stator windings to the connection bars in accordance with various embodiments of the present disclosure. As shown in FIG. 23, the stator windings are divided evenly and consecutively into two groups, and each group has windings occupying consecutive slots. As the sum of all winding currents in a group without having an additional connection to the connection bar should be equal to zero, the phase windings connected to one connection bar should form at least one pair of poles when the motor is operating with the minimum number of poles since the sum of all winding currents within a pair of poles in a balanced system is zero. With the consecutive assignment shown in FIG. 23, the minimum number of pole pairs with which the motor can operate is the number of connection bars (e.g., 2 in the case shown in FIG. 23). If the number of phase conductors in a group is N, the motor can be reconfigured to operate with a pole number of K*2*M, where K is a positive integer up to N/3, considering that the number of conductors in a pair of poles needs to be at least 3 to get a good performance of the motor.

Figure 24:
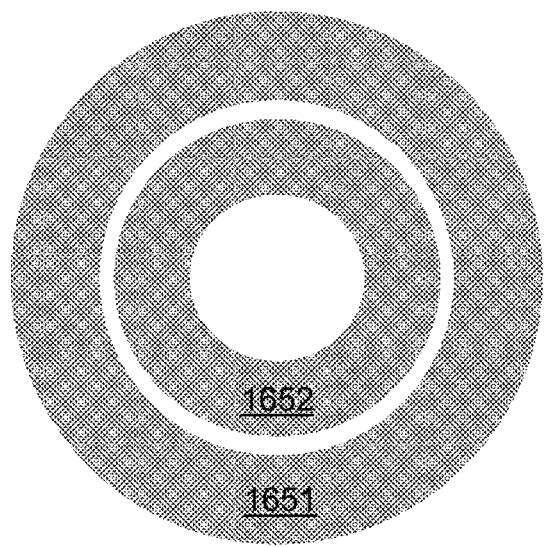
FIG. 24 illustrates a simplified view of a second implementation of the connection rings shown in FIG. 20 in accordance with various embodiments of the present disclosure.

FIG. 24 illustrates a simplified view of a second implementation of the connection rings shown in FIG. 20 in accordance with various embodiments of the present disclosure. The connection rings 1651 and 1652 shown in FIG. 24 are similar to the connection bars shown in FIG. 21 except that the second connection ring 1652 is placed inside and surrounded by the first connection ring 1651 as shown in FIG. 24. There is a gap between the two connection rings 1651 and 1652.

Figure 25:
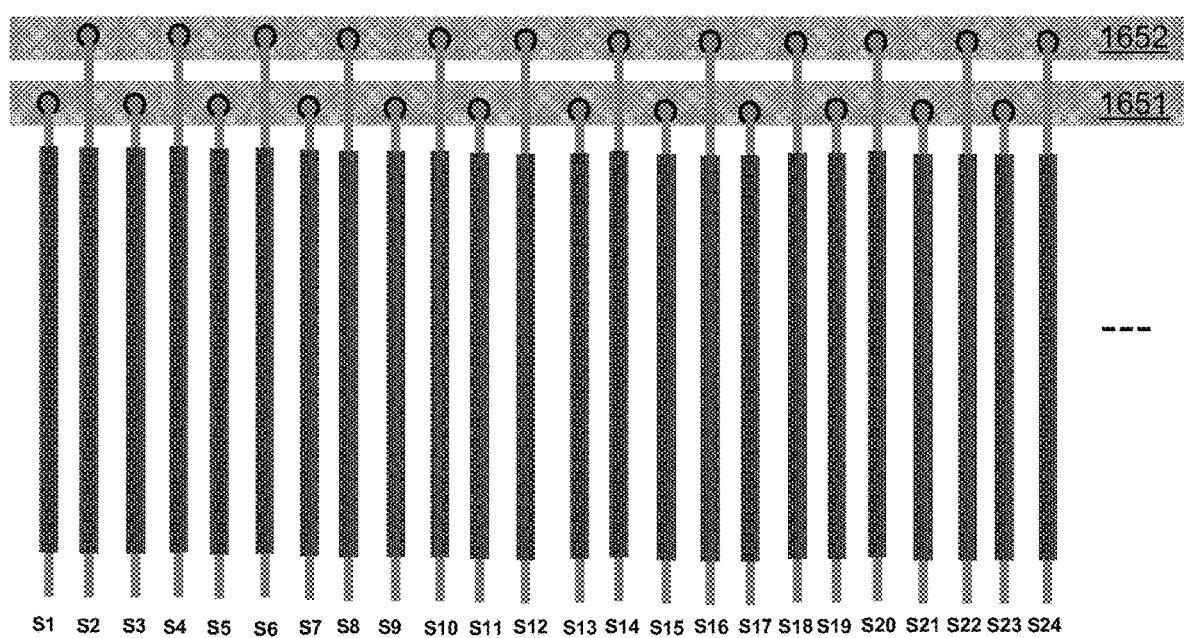
FIG. 25 illustrates a winding assignment suitable for the connection rings shown in FIG. 24.

In some embodiments, the stator windings in a pair of poles may be assigned to different connection rings when arranged in a way shown in FIG. 24. Alternatively, the plurality of conductors connected to a connection ring/bar may belong to different pairs of poles. FIG. 25 illustrates a winding assignment suitable for the connection rings shown in FIG. 24. Again, the windings in the motor are divided evenly into two groups. Each group is coupled to a connection ring. However, each connection ring is not coupled to windings occupying consecutive slots. Instead, a first connection ring 1651 is coupled to the phase windings in odd-numbered slots. A second connection ring 1652 is coupled to the phase windings in even-numbered slots. In this way, the phase windings are assigned to the connection rings evenly and alternatingly, resulting in a balanced and symmetrical configuration.

The stator windings S1, S2, . . . , S24 may be embedded in the stator core. More particularly, the stator windings S1, S2, . . . , S24 may be evenly spaced in the stator core. As shown in FIG. 25, two adjacent stator windings (e.g., S1 and S2) are connected to the first connecting ring 1651 and the second connecting ring 1652 in an alternating manner. This alternating assignment is still a symmetrical arrangement between the phase windings and groups. In this alternating configuration, the minimum number of pole pairs of the motor can be equal to 1. If there are N phase conductors in a group and there are M symmetrical groups arranged in this alternating configuration, then the motor can be reconfigured to operate with number of pole pairs equal K, where K is a positive integer up to N*M/3, on the condition that K is less than N. Such a relationship enables the phase windings within a group to form a balanced and symmetrical subsystem.

In operation, when the number of pole pairs in a motor is increased from a lowest number of pole pairs (Pmin) to a higher number of pole pairs (Padj) by adjusting the phase difference of winding currents in adjacent slots, the windings connected to a connection bar still form a balanced and symmetrical subsystem up to a certain point in which the conductors in a group has the same phase angle. In some embodiments, Padj=K*Pmin, where K is an integer greater than 1 and less than N. It should be noted that a pair of poles should have at least three phase conductors to achieve good performance. Therefore, K should not be greater than N*M/(3*Pmin), where M is the number of connection bars, and N is the number of phase conductors connected to a connection bar.

In alternative embodiments, the number of phase windings within a pair of poles when the motor operates under the lowest number of pole pairs can be divided by an integer L, which is greater than or equal to two. Then the phase conductors within such a pole pair can be evenly and alternatingly divided into L groups, with the conductors in a group connected to a connection bar.

Figure 26:
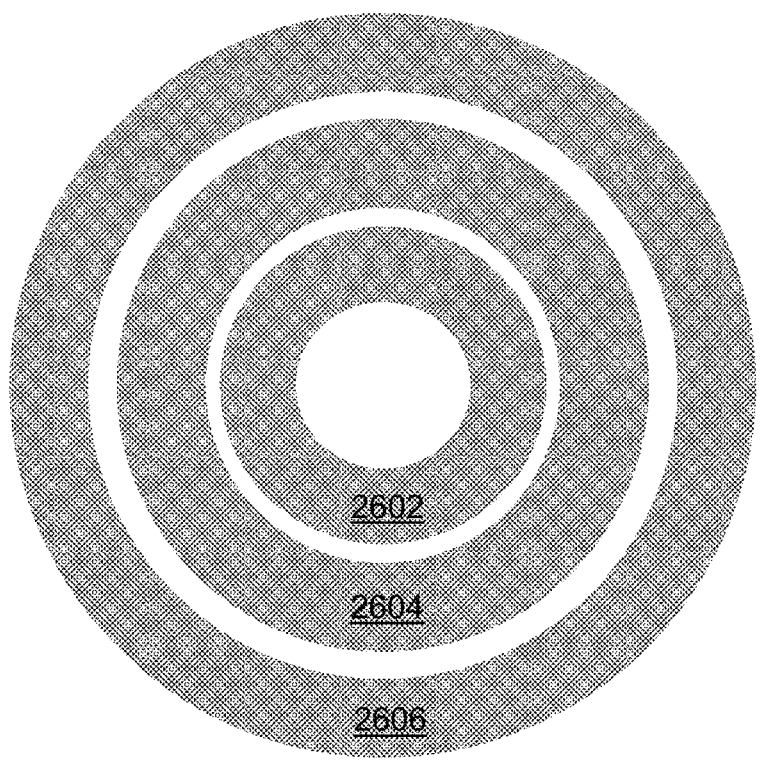
FIG. 26 illustrates a simplified view of a reconfigurable motor system having three connection rings in accordance with various embodiments of the present disclosure.

FIG. 26 illustrates a simplified view of a reconfigurable motor system having three connection rings in accordance with various embodiments of the present disclosure. The connection rings 2602, 2604 and 2606 shown in FIG. 26 are similar to the connection rings shown in FIG. 24 except that there are three concentric rings. A gap is placed between two adjacent connection rings.

Figure 27:
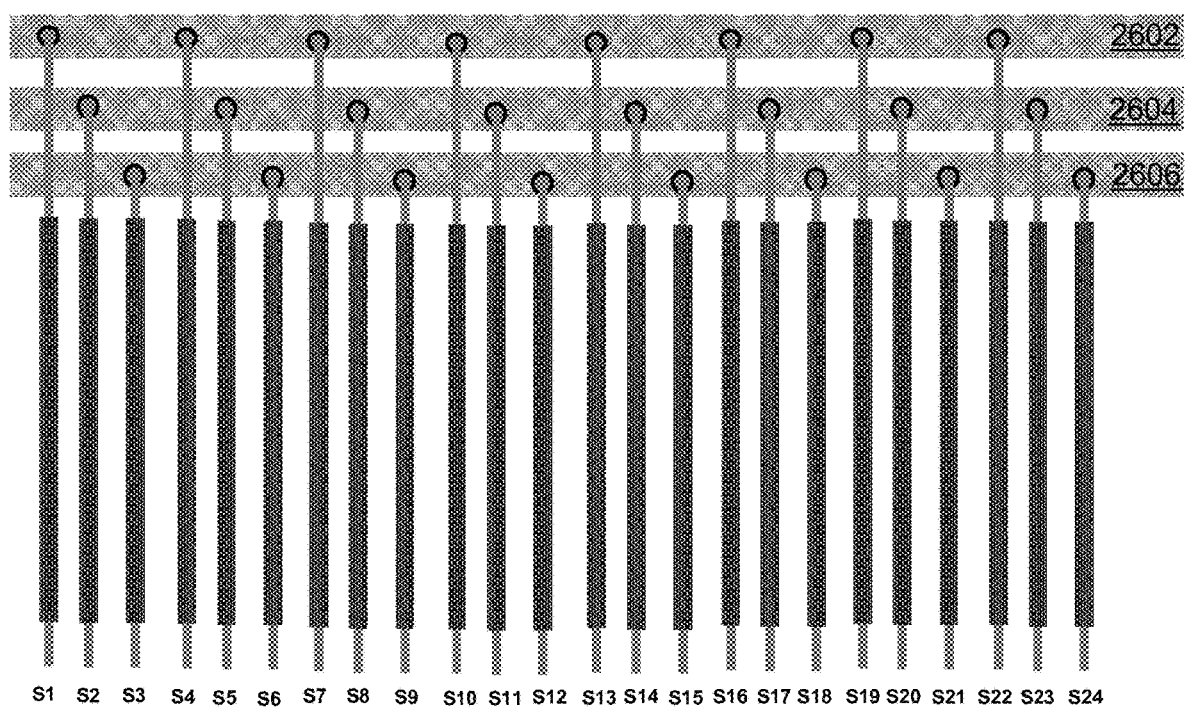
FIG. 27 illustrates a windings assignment suitable for the connection rings shown in FIG. 26 in accordance with various embodiments of the present disclosure.

FIG. 27 illustrates an assignment of the windings into the connection rings in accordance with various embodiments of the present disclosure. As shown in FIG. 27, the stator windings are divided into three groups evenly and alternatingly. The first group comprises a plurality of first stator windings (S1, S4, S7, S10, S13, S16, S19 and S22) coupled to the first connection ring 2602 as shown in FIG. 27. The second group comprises a plurality of second stator windings (S2, S5, S8, S11, S14, S17, S20 and S23) coupled to the second connection ring 2604 as shown in FIG. 27. The third group comprises a plurality of third stator windings (S3, S6, S9, S12, S15, S18, S21 and S24) coupled to the third connection ring 2606 as shown in FIG. 27. The first connecting ring 2602, the second connecting ring 2604 and the third connection ring 2606 are placed in parallel. In this alternating configuration shown in FIG. 27, the minimum number of pole pairs can be equal to one.

The consecutive configuration and the alternating configuration can be used simultaneously in a motor design, resulting in a hybrid configuration. As a result, more groups and more connection bars can be used, resulting in lower voltage rating of each power converter and stator winding for the same total voltage of the input source.

Figure 28:
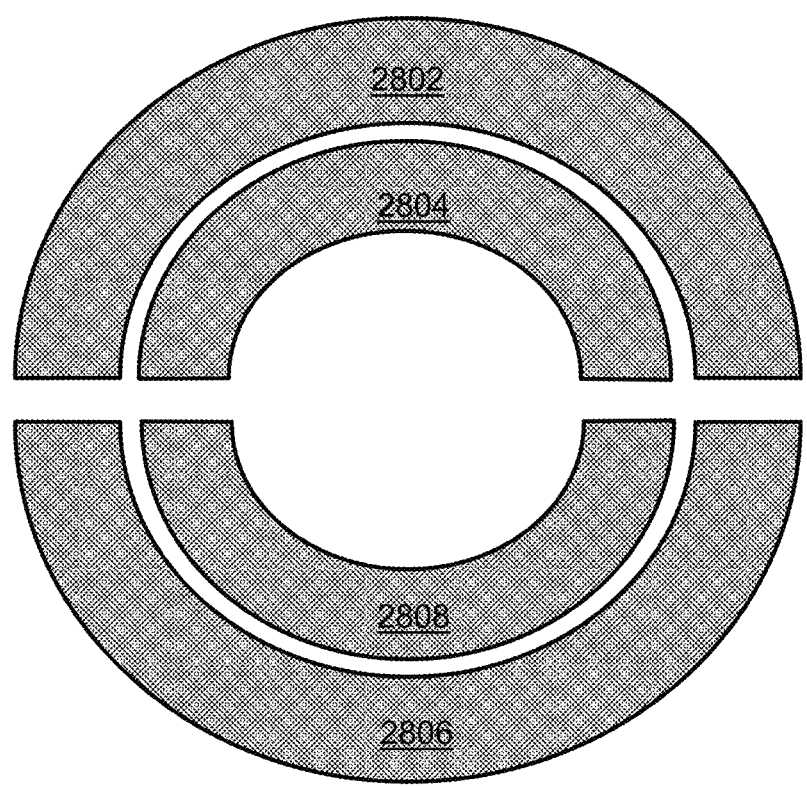
FIG. 28 illustrates a simplified view of a reconfigurable motor system having four connection bars with a hybrid configuration of the connection bars in accordance with various embodiments of the present disclosure.

FIG. 28 illustrates a simplified view of a reconfigurable motor system having four connection bars with a hybrid configuration of the connection bars in accordance with various embodiments of the present disclosure. The connection bars 2802, 2804, 2806 and 2808 shown in FIG. 28 are similar to the connection bars shown in FIG. 24 except that each connection bar of FIG. 24 has been divided into two connection bars as shown FIG. 28.

Figure 29:
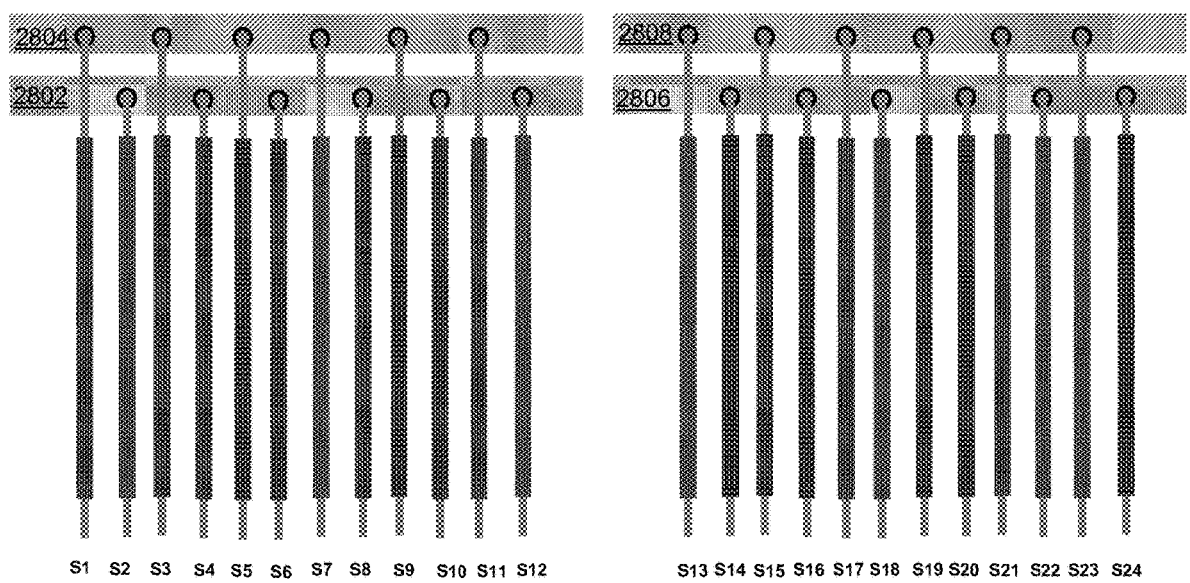
FIG. 29 illustrates a winding assignment suitable for the connection rings of FIG. 28 in accordance with various embodiments of the present disclosure.

FIG. 29 illustrates a winding assignment suitable for the connection rings of FIG. 28 in accordance with various embodiments of the present disclosure. As shown in FIG. 29, the stator windings are divided into four groups. The first group comprises a plurality of first stator windings (S2, S4, S6, S8, S10 and S12) coupled to the first connection ring 2802 as shown in FIG. 29. The second group comprises a plurality of second stator windings (S1, S3, S5, S7, S9 and S11) coupled to the second connection ring 2804 as shown in FIG. 29. The third group comprises a plurality of third stator windings (S14, S16, S18, S20, S22 and S24) coupled to the third connection ring 2806 as shown in FIG. 29. The fourth group comprises a plurality of fourth stator windings (S13, S15, S17, S19, S21 and S23) coupled to the fourth connection ring 2808 as shown in FIG. 29.

The first connecting ring 2802 and the second connecting ring 2804 are placed in parallel. The third connecting ring 2806 and the fourth connecting ring 2808 are placed in parallel. In this hybrid configuration, the minimum number of pole pairs with which the motor can operate is two, but each power converter group's dc link voltage can be equal to one fourth of Vin, where Vin is the total input voltage applied to the power converter system.

FIGS. 30-35 below describe a variety of cooling techniques for reducing the temperature of the reconfigurable motor system. The connection rings/bars described above have a bigger cross sectional area and are more accessible for transferring heat to the outside environment than the stator windings. As such, it is possible to use one or more connection rings/bars as a cooling device to reduce the temperature of the connection rings/bars and the associated stator windings directly. Such a cooling device helps to reduce the temperature of the stator as well as the whole motor.

Figure 30:
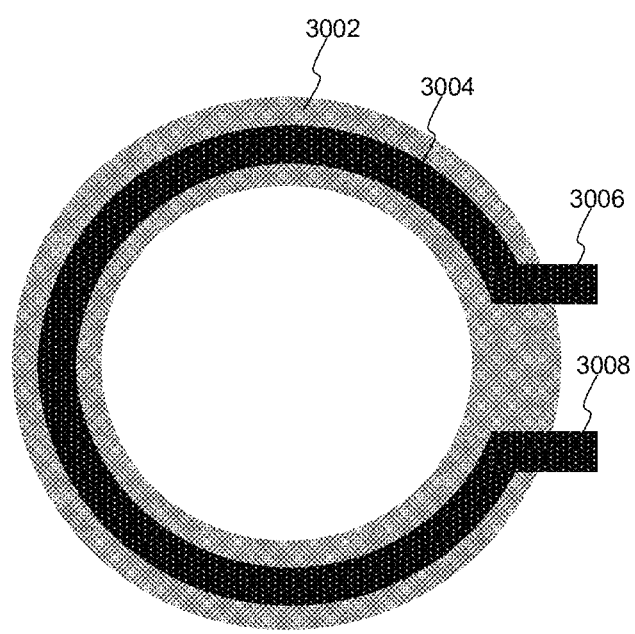
FIG. 30 illustrates a simplified view of a reconfigurable motor system having a cooling device formed in the connection ring in accordance with various embodiments of the present disclosure.

FIG. 30 illustrates a simplified view of a reconfigurable motor system having a cooling device formed in the connection ring in accordance with various embodiments of the present disclosure. The connection ring 3002 is similar to the connection ring 202 shown in FIG. 7, and hence is not discussed again to avoid repetition.

The cooling device 3004 is a heat-transfer device having an inlet 3006 and an outlet 3008. The cooling device 3004 is thermally conductive. It can be placed inside the connection ring 3002. Alternatively, the cooling device 3004 may be placed on a surface of the main body of the connection ring 3002. The cooling device 3004 may be implemented as a liquid cooling pipe. The wall of the liquid cooling pipe is formed of a thermally conductive material such as copper, aluminum, any combinations thereof and the like. A liquid such as water flows from the inlet 3006 to the outlet 3008. The liquid is in contact with the thermally conductive surface of the pipe, thereby absorbing heat from the surface of the pipe.

The cooling device 3004 may be placed anywhere in the connection ring 3002. In some embodiments, the cooling device 3004 is placed along the longitudinal axis of the connection ring 3002 as shown in FIG. 30. As electrical currents tend to flow along the surfaces of the connection ring due to the skin effect, placing the cooling device 3004 inside or on the surface of the connection ring 3002 may not significantly affect the electrical currents flowing through the connection ring 3002.

It should be noted that while FIG. 30 illustrates a liquid cooling pipe, other suitable cooling devices and methods may be combined with the liquid cooling described above. For example, an air cool device may be added into the connection ring 3002. Alternatively, a portion of the liquid pipe may be used for air cooling.

Figure 31:
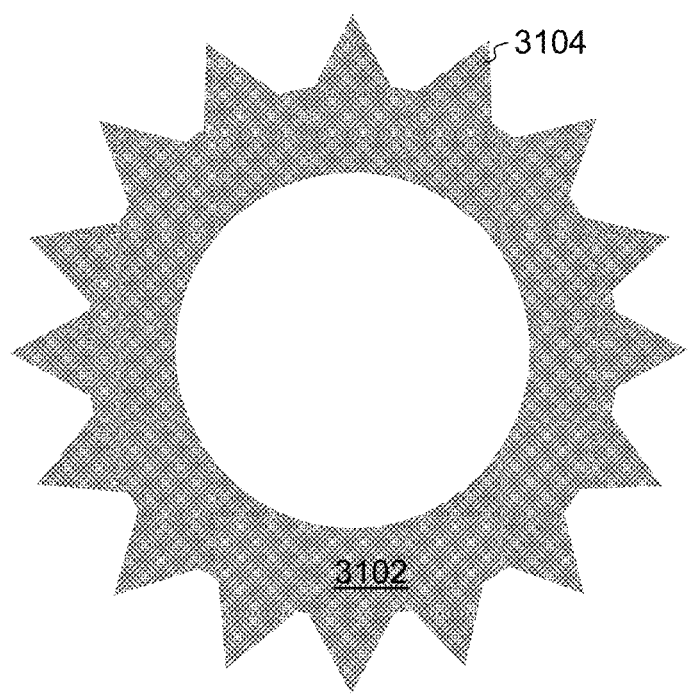
FIG. 31 illustrates a simplified view of a connection ring providing enhanced cooling in accordance with various embodiments of the present disclosure.

FIG. 31 illustrates a simplified view of a connection ring providing enhanced cooling in accordance with various embodiments of the present disclosure. In order to provide enhanced cooling, a plurality of cooling teeth may be formed over the connection ring. As shown in FIG. 31, the connection ring 3102 is similar to the connection ring 202 shown in FIG. 7 except that a plurality of cooling teeth 3104 are formed over the exterior sidewall of the connection ring 3102.

The cooling teeth 3104 function as a plurality of cooling radiators to maximize the surface area in contact with the cooling air. It should be noted that while the cooling teeth 3104 are triangular in shape shown in FIG. 31, it can be any other appropriate shape, such as rectangular, trapezoidal, oval and the like.

Figure 32:
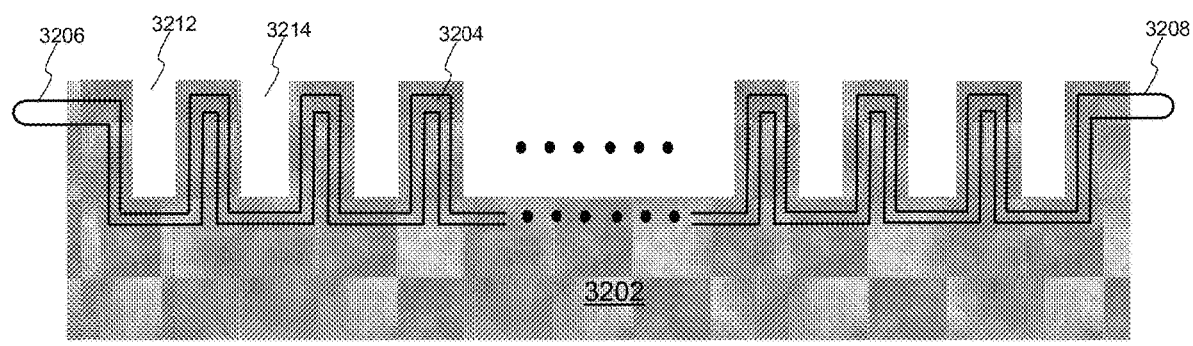
FIG. 32 illustrates a simplified view of another connection ring providing enhanced cooling in accordance with various embodiments of the present disclosure.

FIG. 32 illustrates a simplified view of another connection ring providing enhanced cooling in accordance with various embodiments of the present disclosure. Referring back to FIGS. 7-9, the connection ring may have a plurality of opening for accommodating the stator windings. In order to provide enhanced cooling, the cooling pipe may be placed in the area adjacent to the openings (e.g., between two adjacent openings as shown in FIG. 32). A connection ring with blind-hole openings is a good example to show the concept clearly in FIG. 32. Of course, other types of openings can also be used, and the pattern of the cooling pipe may be adapted to the openings accordingly.

As shown in FIG. 32, openings such as 3212 and 3214 are formed in the connection ring 3202. The cooling device 3204 is a heat-transfer device having an inlet 3206 and an outlet 3208. The main body of the cooling device 3204 is placed along sidewalls of the openings as shown in FIG. 32.

One advantageous feature of having the cooling device shown in FIG. 32 is placing the cooling device 3204 along the sidewalls of the openings helps to increase the surface area in contact with the heated regions of the connection ring.

Figure 33:
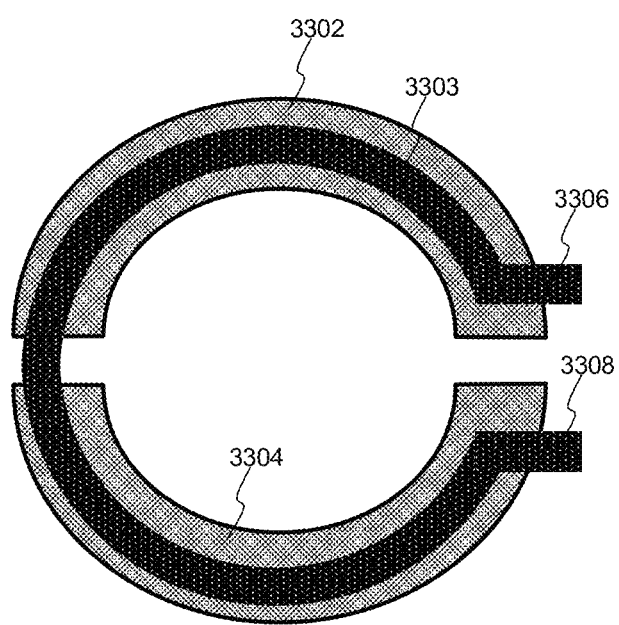
FIG. 33 illustrates a simplified view of a cooling device formed in the connection ring in accordance with various embodiments of the present disclosure.

FIG. 33 illustrates a simplified view of a cooling device formed in the connection ring in accordance with various embodiments of the present disclosure. The connection bars 3302 and 3304 are similar to the connection bars 1651 and 1652 shown in FIG. 21, and hence are not discussed again to avoid repetition.

The cooling device 3303 is a heat-transfer device similar to that shown in FIG. 30 except that two connection bars share a single cooling pipe. As shown in FIG. 33, the cooling device 3303 has an inlet 3306 and an outlet 3308. The main body of the cooling device 3303 is placed such that both the connection bar 3302 and the connection bar 3304 can achieve good thermal conduction. As shown in FIG. 33, the inlet 3306 is connected to the connection bar 3302 and the outlet 3308 is connected to the connection bar 3304.

Figure 34:
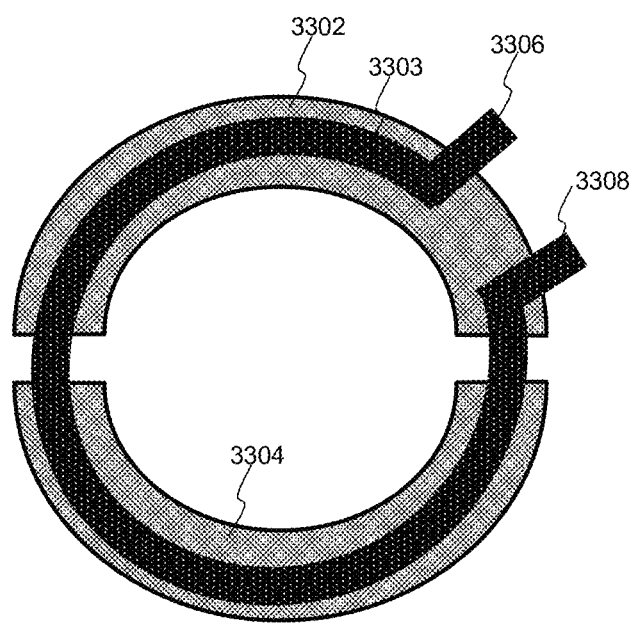
FIG. 34 illustrates a simplified view another cooling device formed in the connection bars in accordance with various embodiments of the present disclosure.

FIG. 34 illustrates a simplified view another cooling device formed in the connection bars in accordance with various embodiments of the present disclosure. The cooling device 3303 of FIG. 34 is similar to that shown in FIG. 33 except that both the inlet 3306 and the outlet 3308 are connected to the connection bar 3302 as shown in FIG. 34.

Figure 35:
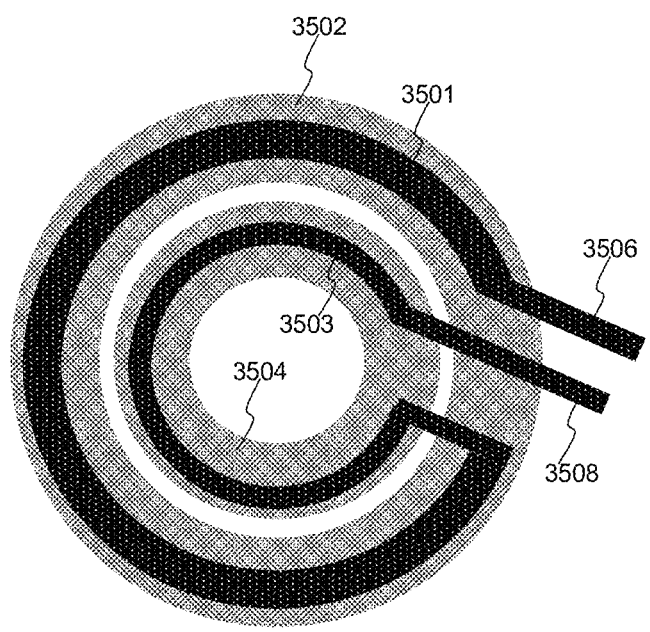
FIG. 35 illustrates a simplified view of another cooling device formed in the connection rings in accordance with various embodiments of the present disclosure.

FIG. 35 illustrates a simplified view another cooling device formed in the connection rings in accordance with various embodiments of the present disclosure. The connection rings 3502 and 3504 are similar to the connection rings 1651 and 1652 shown in FIG. 24, and hence are not discussed again to avoid repetition.

The cooling device 3501 is a heat-transfer device. As shown in FIG. 35, the cooling device 2501 has an inlet 3506 and an outlet 3508. The main body of the cooling device 3501 is placed such that both the connection ring 3502 and the connection ring 3504 can achieve good thermal conduction with it. As shown in FIG. 35, the cooling device 3501 extends from the inlet 3506 along the longitudinal axis of the connection ring 3502, crosses the gap between these two connection rings and further extends along the longitudinal axis of the connection ring 3504 and reaches the outlet 3508 as shown in FIG. 35.

In some embodiments, each winding may only produce or stand a low voltage in operation. The multiple connection bar configurations may be coupled to higher input voltages when multiple input sources are connected in series. The input voltage source may be implemented as real voltage sources such as battery packs, or as pseudo voltage sources such as capacitors. In some applications, it may be desirable to increase the voltage capability even further. In such cases, it would be desirable to have multiple conductors in a slot of the stator.

Figure 36:
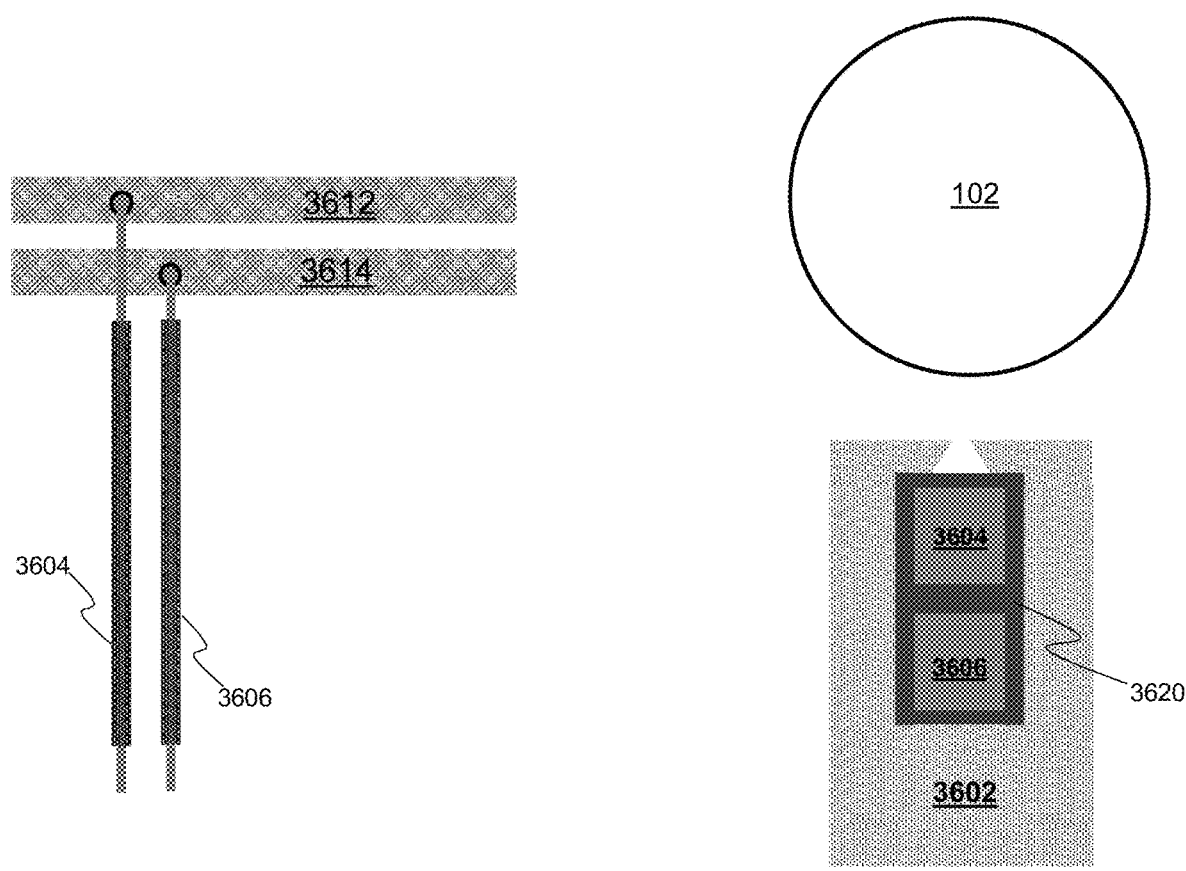
FIG. 36 illustrates a cross sectional view of a slot of the stator accommodating multiple conductors in accordance with various embodiments of the present disclosure.

FIG. 36 illustrates a cross sectional view of a slot of the stator comprising multiple conductors in accordance with various embodiments of the present disclosure. The stator 3602 comprises a plurality of slots. One of the slots is selected to illustrate the innovative aspect of the present disclosure. As shown in FIG. 36, two conductors 3604 and 3606 are embedded in the slot. The conductor 3604 is on top of the conductor 3606. There may be an insulation layer 3620 formed between and around these conductors. It should be noted that while FIG. 36 shows one conductor on top of the other conductor, the conductors may be arranged in a variety of manners. For example, the two conductors may be placed side by side in the slot. It should further be noted that two conductors in one slot shown in FIG. 36 is merely an example. The slot could accommodate any number of conductors.

One advantage of having multiple conductors in a slot is that the conductors in a slot may be assigned to different phase windings. They may also be assigned to different groups and connected to different rings. FIG. 36 further illustrates an assignment between the conductors and the connection rings. The conductor 3604 and the conductor 3606 belong to two different winding groups (e.g., the stator winding groups shown in FIG. 16) and are controlled by different power converters, and thus connected to different connection rings as shown in FIG. 36. In particular, the conductor 3604 is connected to a first connection ring 3612. The conductor 3606 is connected to a second connection ring 3614. The connection rings 3612 and 3614 can be implemented as any ring/bar configurations described above. In some embodiments, the conductor 3604 and the conductor 3606 are coupled to two different power sources. In some embodiments the currents in 3604 and 3606 are controlled to have the same phase angle and/or the same amplitude.

Another advantageous feature of having multiple conductors in a slot is that multiple connectors may be connected in series to form a winding to produce a higher voltage. Yet another advantageous feature of having multiple conductors in a slot is that such a winding configuration (a plurality of conductors connected in series) allows the conductors in a slot to have different phase angles, and thus a winding can be distributed in different slots of the motor, thereby smoothing the changes in the spatial magnetomotive force (MMF) and reducing the space harmonics of the magnetic field in the airgap. All the conductors in a slot form a conductor assembly, and each assembly may be divided evenly into two or more branches, where each branch contains conductors belonging to only one phase. In this way, a slot may contain a conductor assembly with multiple branches which belong to different phases, and a phase winding may occupy a partial slot.

FIG. 37 illustrates a first exemplary winding arrangement of a reconfigurable motor system having thirty six slots in the stator in accordance with various embodiments of the present disclosure. Each conductor assembly in a slot has two branches arranged in a top-bottom configuration. Of course it is feasible also to have more than two branches in a conductor assembly, and the branches in a conductor assembly may be arranged in a side-by-side configuration. In some embodiments, the reconfigurable motor system shown in FIG. 37 can be configured to have one pair of poles and nine phases. Each phase winding has a positive segment (e.g., A+ for phase A) and a negative segment (e.g., A− for phase A). A segment may comprise multiple conductor branches. There are nine phases from phase A to phase I as shown in FIG. 37.

As shown in FIG. 37, in each slot (e.g., slot S1), there is a conductor assembly which has two branches of conductors (A+ and E−), and each branch may have multiple conductors which can form multiple turns in a phase winding. In some embodiments, the conductor assemblies in the thirty six slots form a pair of poles in the configuration of having the minimum number of poles. In this case, the phase angle difference between winding currents in adjacent phases is 40°, but the equivalent slot magnetic force (caused by the conductor currents in a slot) has an angel difference of 10° between adjacent slots.

In some embodiments, each stator winding (e.g., winding A) is distributed in six different slots. More particularly, three slots are employed to accommodate the positive segment and three slots are employed to accommodate the negative segment. For example, the positive segment of winding A shown in FIG. 37 occupies the top half of the first slot S1 to form a branch and the bottom half of the third slot S3 to form another branch, and the full slot of the second slot S2 to form two more branches. Similarly the negative segment of winding A occupies slots S19, S20 and S21. In this way, a phase winding starts with a partial slot in both directions. One advantageous feature of having such an arrangement is the space harmonics may be reduced because each winding starts and ends with a partial slot.

FIG. 37 illustrates nine windings (winding A to winding I). There are thirty nine slots (slots S1-S36). Each winding can occupies four full slots. The slots occupied by each winding can be spread and distributed into more slots. For example, each winding occupies six slots as is shown in FIG. 37.

It should be noted depending on different applications and design needs, the winding arrangement may vary accordingly. For example, the positive segments of winding A may occupy two full slots (e.g., slots 1 and 2) or spread into more than three slots when needed.

Figure 38:
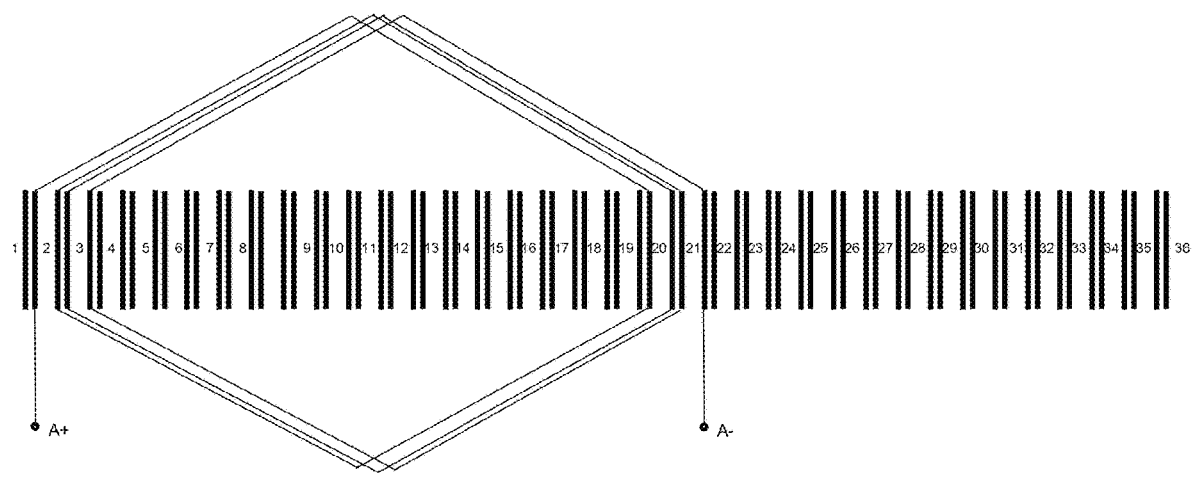
FIG. 38 shows an exemplary way to connect conductors of a winding in accordance with various embodiments of the present disclosure.

FIG. 38 shows an exemplary way to connect conductors of a winding in accordance with various embodiments of the present disclosure. Referring back to FIG. 37, there are thirty six slots. Each slot has two branches of conductors, and each branch of conductors may have multiple conductors. The positive segment of winding A occupies slots S1, S2 and S3. The negative segment of winding A occupies slots S19, S20 and S21.

As shown in FIG. 38, a first terminal of a conductor of slot 1 is connected to the positive terminal of phase A winding (A+). A second terminal of the conductor of slot 1 is connected to a first terminal of the conductor of slot 19. A second terminal of the conductor of slot 19 is connected to a first terminal of a first conductor of slot 2. A second terminal of the first conductor of slot 2 is connected to a first terminal of a first conductor of slot 20. A second terminal of the first conductor of slot 20 is connected to a first terminal of a second conductor of slot 2. A second terminal of the second conductor of slot 2 is connected to a first terminal of a second conductor of slot 20. A second terminal of the second conductor of slot 20 is connected to a first terminal of the conductor of slot 3. A second terminal of the conductor of slot 3 is connected to a first terminal of the conductor of slot 21. A second terminal of the conductor of slot 21 is connected to the negative terminal of phase A winding (A−).

In the winding configuration shown in FIG. 38, the positive segment and the negative segment of winding A are spaced 180° apart spatially. Such a winding configuration is called a full-pitch winding. In this system, the minimum number of pole pairs is equal to one. It should be noted it is possible to repeat this winding arrangement to form more pairs of poles as shown in FIGS. 39-40 below.

In some embodiments, the winding configuration shown in FIG. 37 and FIG. 38 is a configured to have one pair of poles as the minimum pole number configuration. A positive segment (e.g., A+ in S1) and a negative segment (e.g., A− in S19) of a winding are spaced apart by 180° in this 2-pole configuration, with the phase angle difference between winding currents in adjacent phases to be 40°. In order to improve the performance of the reconfigurable motor system under various operating conditions, the number of the pole pairs may be adjusted accordingly by increasing the phase angle difference between adjacent phases. If the new number of the pole pairs is an odd number K, then the phase angle difference between adjacent phases is K*40°, and the space angle difference between the positive segment A+ and the negative segment A− is K*180° which is equivalent to 180°. Therefore, the positive segment A+ and the negative segment A− can still form a phase winding. With the winding configuration shown in FIG. 38, by increasing the phase angle difference to 120° between winding currents flowing through the adjacent phases, the motor can operate as a six-pole and three-phase configuration. In operation, the reconfigurable motor system shown in FIG. 38 can be dynamically adjusted from a system having one pair of poles and nine phases to a system having three pairs of poles and three phases.

FIG. 39 shows another winding arrangement in accordance with various embodiments of the present disclosure. The reconfigurable motor system comprises seventy two slots in the stator. The arrangement of the conductors in these slots can be obtained by repeating the arrangement shown in FIGS. 37-38. The windings can be divided into two sections. A first section occupies slots 1-36. A second section occupies slots 37-72. Each section of the windings is arranged in the same way as that in FIG. 37, and can operate in the same way as described above.

The minimum number of pole pairs is two now. It is possible to connect the corresponding windings in the two halves (e.g., winding A in the first section and winding A in the second section) in series or in parallel to have a nine-phase reconfigurable motor system. Nine power converters may be required to control this reconfigurable motor system. Alternatively, if the windings of these two halves are not connected to each other, the windings can form an eighteen-phase reconfigurable motor system. Eighteen power converters may be required to control this reconfigurable motor system.

FIG. 40 shows yet another winding arrangement in accordance with various embodiments of the present disclosure. The arrangement is based upon a short-pitch winding instead of a full-pitch winding to reduce the space harmonics. This is a 72-slot configuration similar to the one shown in FIG. 39. The difference is that in the first section, the positive segment and the negative segment of a winding are spaced apart by 170° space angel in the minimum pole number configuration, because the conductor assembly in a slot (here E+ and I− in slot 17) have been moved out, and the rest of the conductors are shifted one slot so the negative segment of phase A winding starts from slot 18 rather than slot 19 as shown in FIG. 39.

Furthermore, FIG. 40 shows windings E and I only occupy four slots in the first section rather than six slots as shown in FIG. 39. To make up the reduced numbers of slots (and thus turns) of wingdings E and I in the first section, in the second section, windings E and I occupy eight slots, resulting in a 190° spatial difference between the positive segment and the negative segment of the winding under the minimum pole number configuration, which is actually a long-pitch implementation. The long-pitch implementation has a similar impact as the short-pitch implementation for reducing the space harmonics caused by MMF. The corresponding windings in these two sections in this configuration should be connected in series. As a result, each winding will have about the same voltage. It is also possible to create even shorter-pitch windings by moving more slots from one section to the other, preferably in a different winding or windings.

With this arrangement, the motor can be configured to have Kodd*Pmin pairs of poles, where Pmin is the minimum number of pole pairs, and Kodd is a positive odd integer between 1 and Koddmax, with Koddmax being the biggest odd integer which allows the windings be evenly split into each pole pair. For example, if a motor has nine windings arranged in 36 slots as is shown in FIG. 37, it can be configured to have two poles or six poles. If a motor has fifteen windings, it can be dynamically reconfigured to operate in various operation modes including two poles, six poles or ten poles.

Each winding (e.g., winding A) shown in FIGS. 37-40 has two connection terminals. These two terminals can be coupled in to a power converter (e.g., a full-bridge and the like). FIGS. 41-45 below illustrate the connection between the windings and the power converters.

Figure 41:
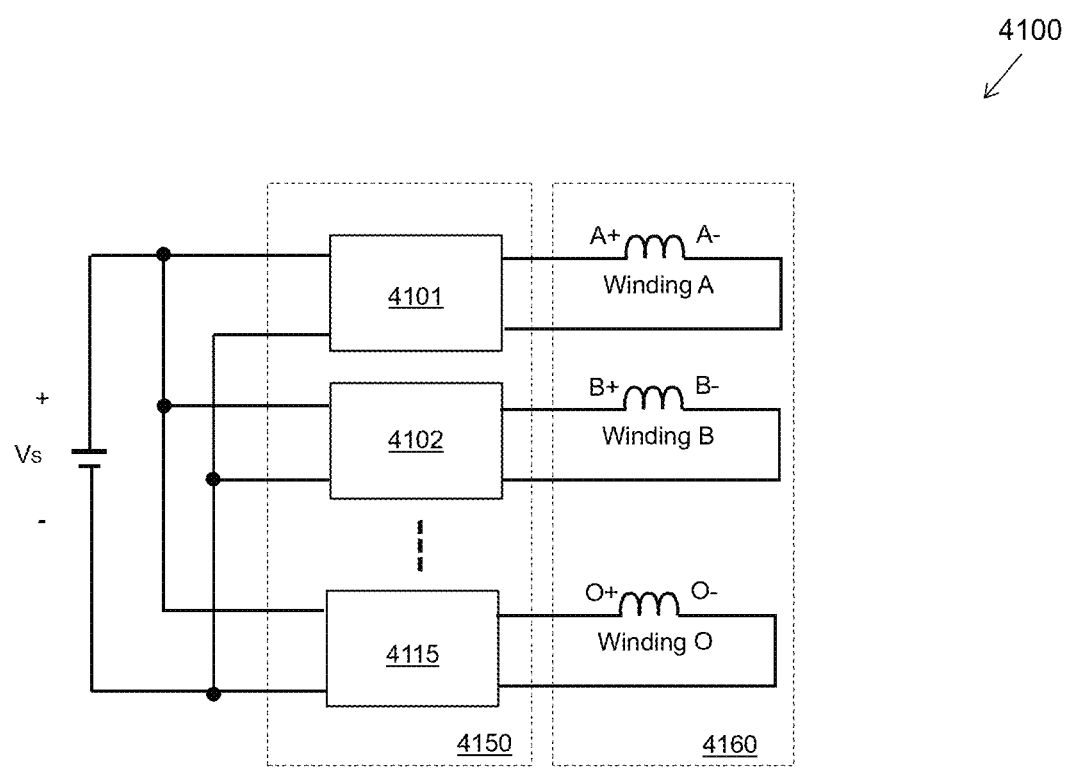
FIG. 41 illustrates a block diagram of a reconfigurable motor system having fifteen phases in accordance with various embodiments of the present disclosure.

All the power converters can be connected to a single power source. FIG. 41 illustrates a block diagram of a reconfigurable motor system having fifteen phases in accordance with various embodiments of the present disclosure.

The fifteen phases are denoted as phase A, B, C, . . . , O as shown in FIG. 41. The reconfigurable motor system 4100 comprises fifteen power converters. All power converters 4101-4115 are coupled to the input voltage. The power converters form a power converter group 4150. There are fifteen windings in the motor 4160. Each winding (e.g., winding A) has two terminals connected to a power converter (e.g., power converter 4101). It should be noted that no connection bar is needed as shown in FIG. 41 because both ends of each winding are connected to a full-bridge type power converter. If the power converter is a half-bridge type converter, then one end of all the phase windings can be connected together, preferably through a connection ring or connection bar.

Sometimes it is advantageous to divide the windings into several groups, and couple them through groups of power converters to a plurality of input voltage sources, which may be connected in series in a similar configuration as in FIG. 16.

Similar to previous discussions, the phase windings in the configurations such as those shown in FIGS. 37, 39 and 40 can also be divided into groups in consecutive or sequential configurations. The windings of each group are then coupled to a group of power converters. Taking a fifteen-winding motor with a consequential configuration as an example, windings A, D, G, J, M can form a first group. Windings B, E, H, K, N can form a second group. Windings C, F, I, L, 0 can form a third group.

Figure 42:
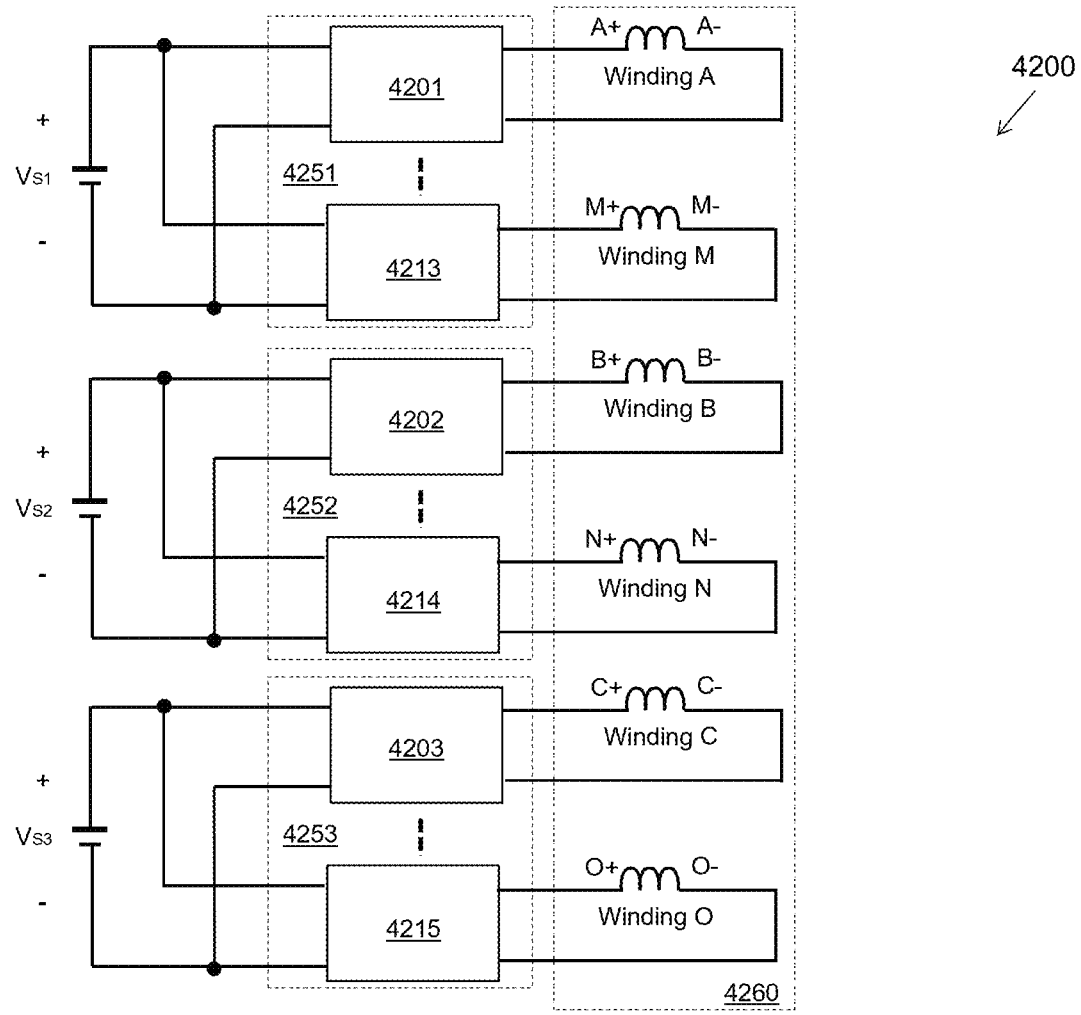
FIG. 42 illustrates a block diagram of an alternating configuration in accordance with various embodiments of the present disclosure.

FIG. 42 illustrates a block diagram of an alternating configuration in accordance with various embodiments of the present disclosure. The reconfigurable motor system 4200 comprises fifteen power converters and fifteen phase windings. The power converters and the windings are divided into three groups. The first group 4251 includes power converters 4201, 4204 4207, 4210, and 4213. The second group 4252 includes power converters 4202, 4205, 4208, 4211 and 4214. The third group 4253 includes power converters 4203, 4206, 4209, 4212, and 4215. The fifteen windings in the system are divided into three groups in the same way. The windings are divided evenly and alternatingly as discussed earlier.

Figure 43:
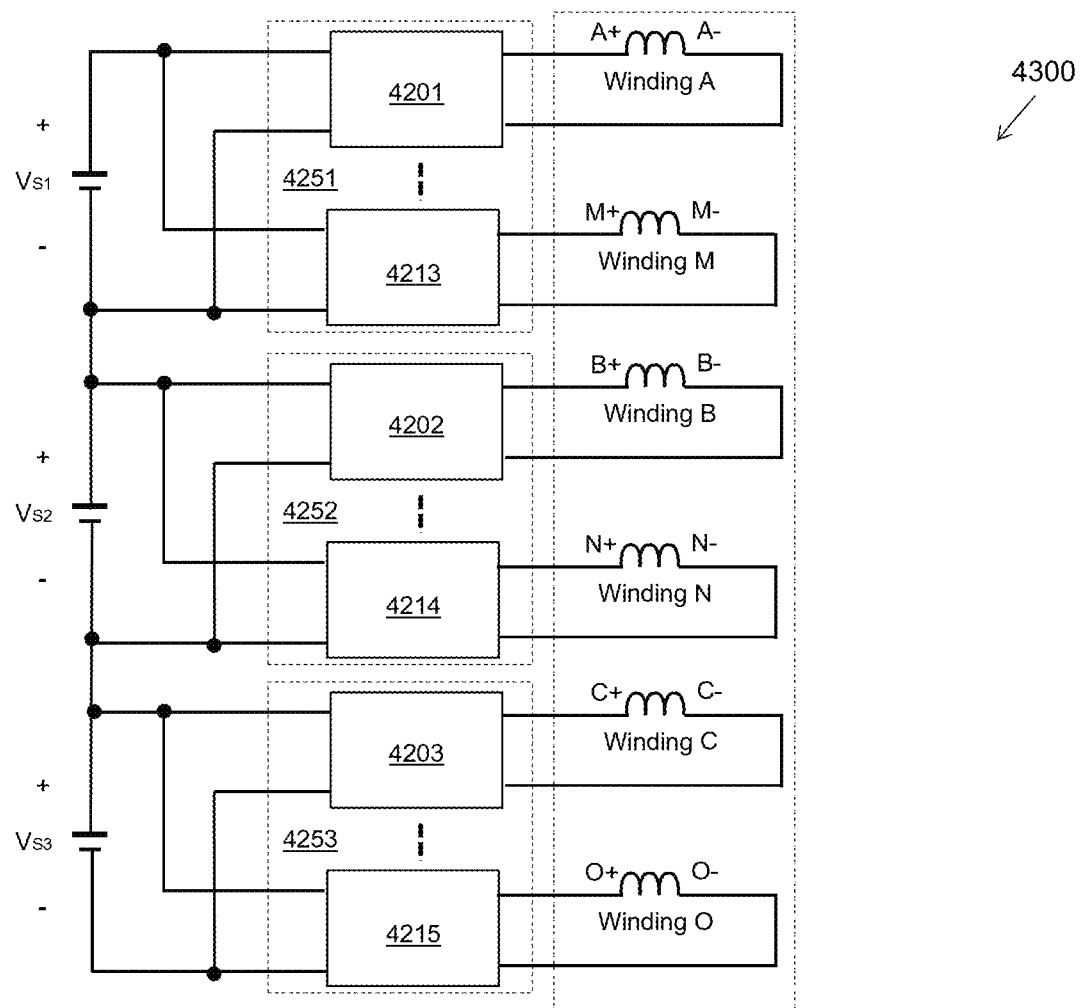
FIG. 43 illustrates a block diagram of another reconfigurable motor system in accordance with various embodiments of the present disclosure.

FIG. 43 illustrates a block diagram of another reconfigurable motor system in accordance with various embodiments of the present disclosure. The reconfigurable motor system 4300 is similar to the reconfigurable motor system 4200 shown in FIG. 42 except that the three input power sources VS1, VS2 and VS3 are connected in series.

Figure 44:
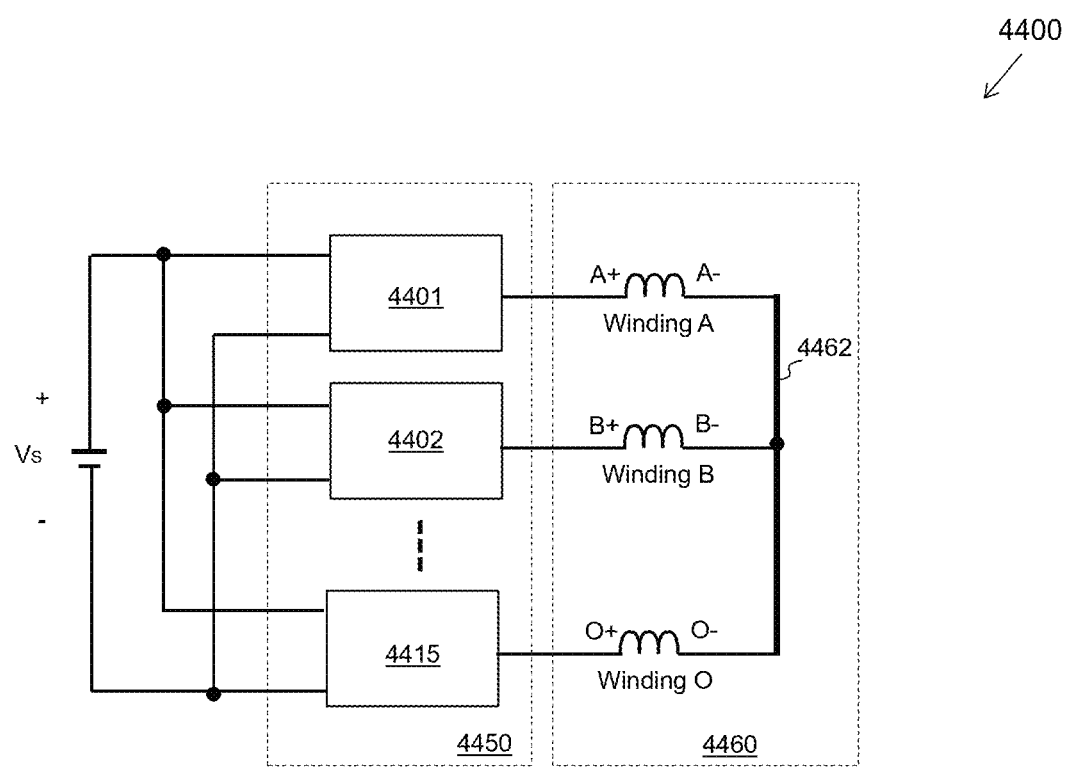
FIG. 44 illustrates a block diagram of another reconfigurable motor system in accordance with various embodiments of the present disclosure.

FIG. 44 illustrates a block diagram of another reconfigurable motor system in accordance with various embodiments of the present disclosure. The reconfigurable motor system 4400 is similar to the reconfigurable motor system 4100 shown in FIG. 41 except that first ends of all windings (either the positive ends or the negative ends) are connected to their respective power converters and second ends of the windings are connected together through one connection bar or ring 4462. The motor 4460 is connected to the input power source Vs through the power converter group 4450. It should be noted under the configuration shown in FIG. 44, the power converters 4401-4415 should be half-bridge type power converters.

Figure 45:
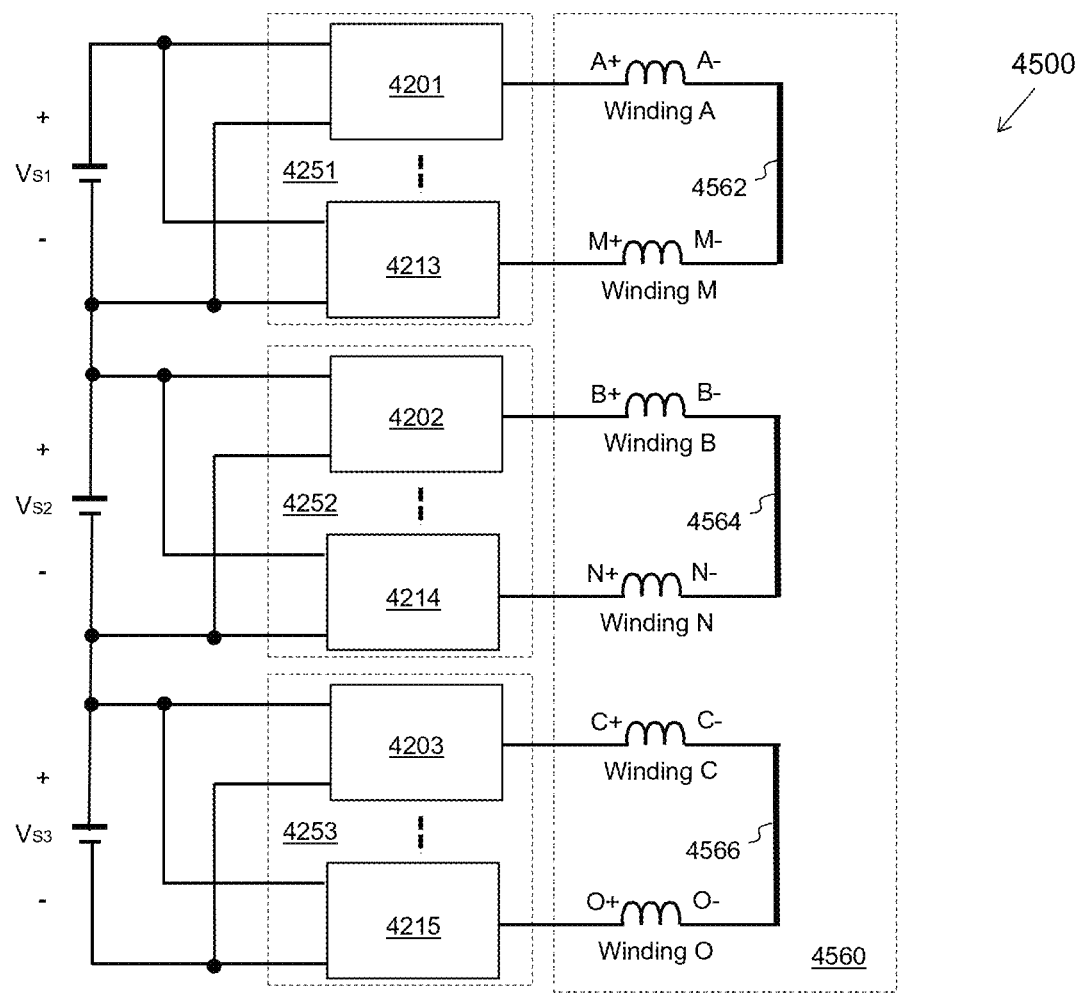
FIG. 45 illustrates a block diagram of another reconfigurable motor system in accordance with various embodiments of the present disclosure.

FIG. 45 illustrates a block diagram of another reconfigurable motor system in accordance with various embodiments of the present disclosure. The reconfigurable motor system 4500 is similar to the reconfigurable motor system 4300 shown in FIG. 43 except that first ends of all windings (either the positive end or the negative end) are connected to their respective power converters and second ends of the windings are connected together through connection bars or rings (e.g., rings or bars 4562, 4564 and 4566). The connection bars shown in FIG. 45 are left floating and thus isolated from each other.

It should be noted that depending on different applications, the three input power sources VS1, VS2 and VS3 may be connected in series or at least one of them may be left floating. With the configurations shown in FIGS. 41 and 44, the fifteen-phase motor can be reconfigured to work with two poles, six poles or ten poles. With the configuration shown in FIGS. 42, 43 and 45, the fifteen-phase motor can be reconfigured to work with two poles or six poles.

Figure 46:
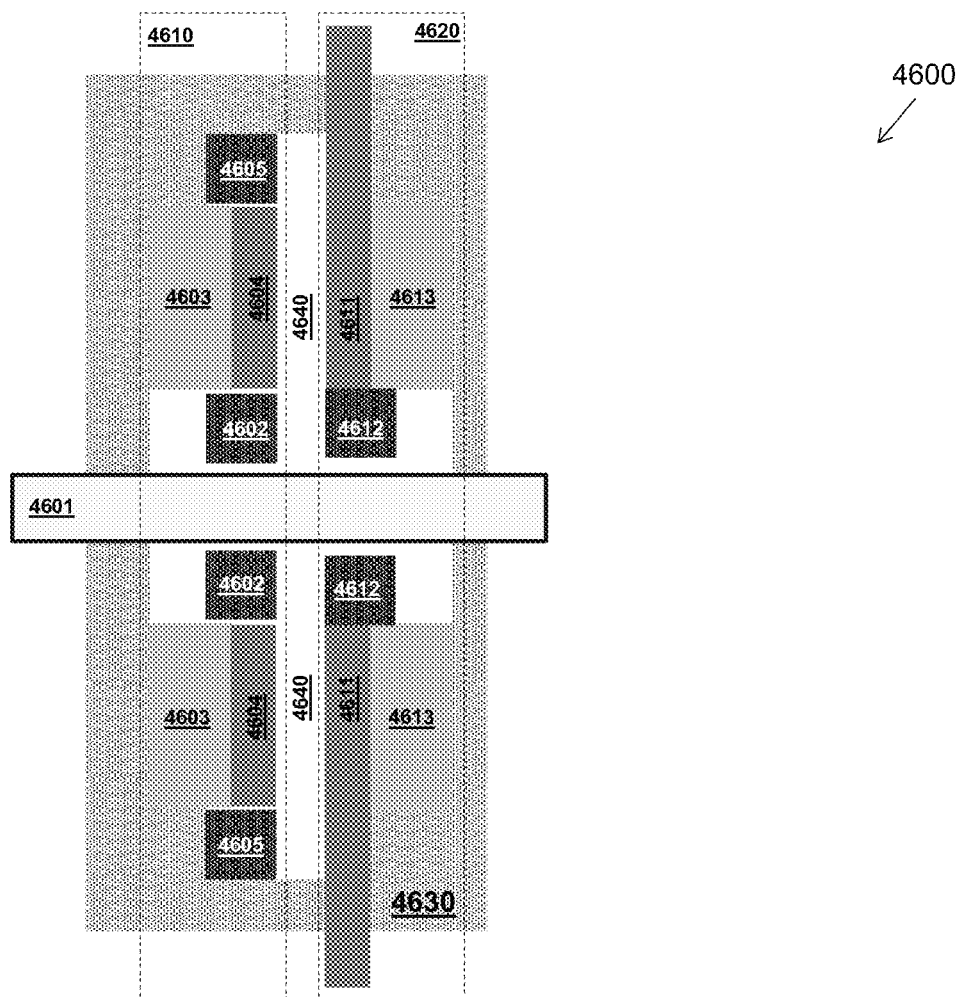
FIG. 46 illustrates a side view of an axial flux induction machine in accordance with various embodiments of the present disclosure.

So far the discussion has been focused on radial flux machines. The innovative aspects in the present disclosure are also applicable to axial flux machines. The axial flux machines may include induction machines, permanent magnet machines, reluctance machines or hybrid machine. FIG. 46 below gives an example.

FIG. 46 illustrates a side view of an axial flux induction machine (AFIM) in accordance with various embodiments of the present disclosure. The AFIM 4600 is inside a motor housing apparatus 4630. The AFIM includes a rotor 4610 and a stator 4620. The stator 4620 and the rotor 4610 are on opposite sides of an air gap 4640. The AFIM 4600 further comprises a shaft 4601. As shown in FIG. 46, the shaft 4601 is placed in a center portion of the motor housing apparatus 4630. The shaft 4601 extends through the motor housing apparatus 4630.

The rotor 4610 includes an inner ring 4602, a rotor phase conductor 4604, a rotor magnetic material region 4603 and an outer ring 4605. The shaft 4601 is surrounded by the inner ring 4602. The rotor magnetic material region 4603 is on top of the rotor phase conductor 4604. The rotor phase conductor 4604 and the rotor magnetic material region 4603 are placed between the inner ring 4602 and the outer ring 4605.

The stator 4620 includes a connection ring 4612, a stator phase winding 4611 and a stator magnetic material region 4613. The shaft 4601 is surrounded by the connection ring 4612. The stator phase winding 4611 is between the air gap 4640 and the stator magnetic material region 4613 as shown in FIG. 46. As discussed previously, in some embodiments the connection ring may be replaced by a plurality of connection bars in a consecutive or alternating configuration.

In some embodiments, the rotor 4610 of the AFIM 4600 has a squirrel winding structure, which will be described below with respect to FIG. 48.

Figure 47:
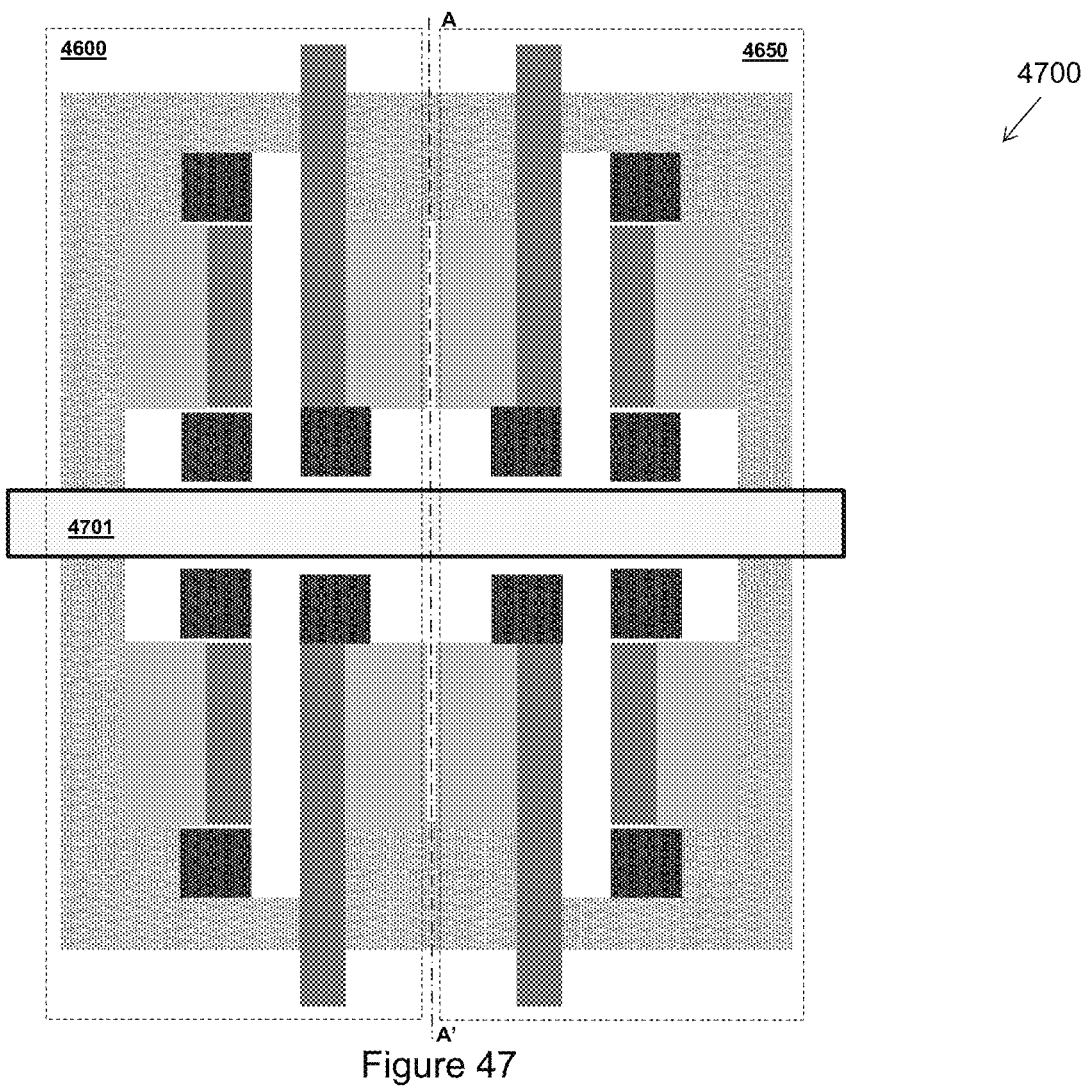
FIG. 47 illustrates a side view of a dual configuration of the axial flux induction machine shown in FIG. 46 in accordance with various embodiments of the present disclosure.

FIG. 47 illustrates a side view of a dual configuration of the axial flux induction machine shown in FIG. 46 in accordance with various embodiments of the present disclosure. The AFIM 4700 comprises a first AFIM 4600 and a second AFIM 4650. The structure of the AFIM 4600 has been described above with respect of FIG. 46. The structure of the second AFIM 4650 is similar to that of the first AFIM 4600. As shown in FIG. 47, the first AFIM 4600 and the second AFIM 4650 have an identical structure and are symmetrical with respect to the middle line A-A'. The shaft 4701 is shared by the first AFIM 4600 and the second AFIM 4650. In FIG. 47, the stators of the two machines are coupled together. Alternatively, the two rotors in a dual configuration can be coupled together.

As shown in FIG. 47, the first AFIM 4600 and the second AFIM 4650 are back-to-back connected to each other. As a result of having two AFIM structures back-to-back connected to each other, the shaft-direction forces from these two AFIM structures can completely cancel out or almost completely cancel out.

It should be noted that in this dual configuration of the AFIM structures, the magnetic material regions of the stator may be combined together if necessary. Furthermore, a stator winding of the first AFIM 4600 and the stator winding of the second AFIM 4650 in the same region may be combined into a single winding, which may avoid the need of the inner connection ring, thereby simplifying the winding structure. Both ends of each stator winding then can be placed at the outer end, and then connected through connection bars or a connection ring if these windings are coupled to half-bridge converters in similar way as discussed previously. Alternatively, in some embodiments the rotor magnetic regions and/or the rotor windings of the two AFIM in a dual configuration may be integrated. The magnetic material in the stator and rotor may be any suitable magnetic materials such as soft ferrite, iron power, MPP, other non-permanent magnetic compounds formed to certain shapes suitable for the AFIM application, any combinations thereof and the like.

The stator core and/or the rotor core may be formed by baking, depositing, plating, molding, casting, printing or other suitable processes. Alternatively, the stator core and/or rotor core may be laminated silicon steel or other magnetic sheets preassembled together. It should be noted that portions of the stator core and/or the rotor core may be formed by the processes described above.

The single configuration shown in FIG. 46 and the dual configuration shown in FIG. 47 can serve as basic AFIM building modules. By integrating more AFIM building modules on the same shaft, higher power AFIM machines can be designed in a modular approach. More winding groups may be naturally formed in this way. All stators should be configured and controlled to work in the same mode during normal operation.

Figure 48:
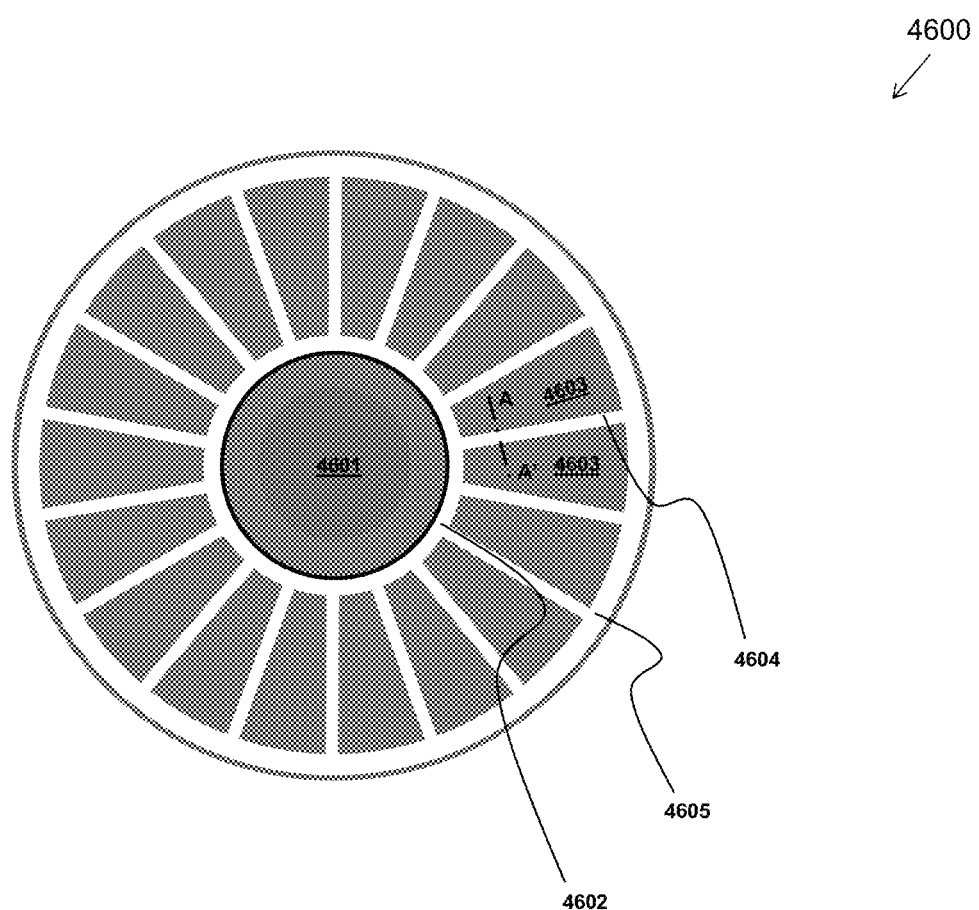
FIG. 48 illustrates a side view of a squirrel winding structure of the axial flux induction machine shown in FIG. 46 in accordance with various embodiments of the present disclosure.

FIG. 48 illustrates a side view of a squirrel winding structure of the axial flux induction machine shown in FIG. 46 in accordance with various embodiments of the present disclosure. The side view of FIG. 48 is from the air gap shown in FIG. 46. The shaft 4601 is at the center as shown in FIG. 48. The shaft 4601 is surrounded by the rotor magnetic material regions 4603. As shown in FIG. 48, the rotor magnetic material regions 4603 are evenly spaced over the rotor surface.

The rotor windings comprise many straight phase conductors evenly distributed over the rotor surface in a radial fashion and shorted together at the ends by two end rings, an inner ring 4602 and an outer ring 4605 as shown in FIG. 48. The cross sectional view of the rotor winding will be described below with respect to FIG. 49.

It should be noted the connection rings/bars described above with respect to FIGS. 1-45 are applicable to the axial flux induction machine shown in FIGS. 46-48. Furthermore, the adjustment of the number of pole pairs and the number of phases described above with respect to FIGS. 1-45 are applicable to the axial flux machines.

Figure 49:
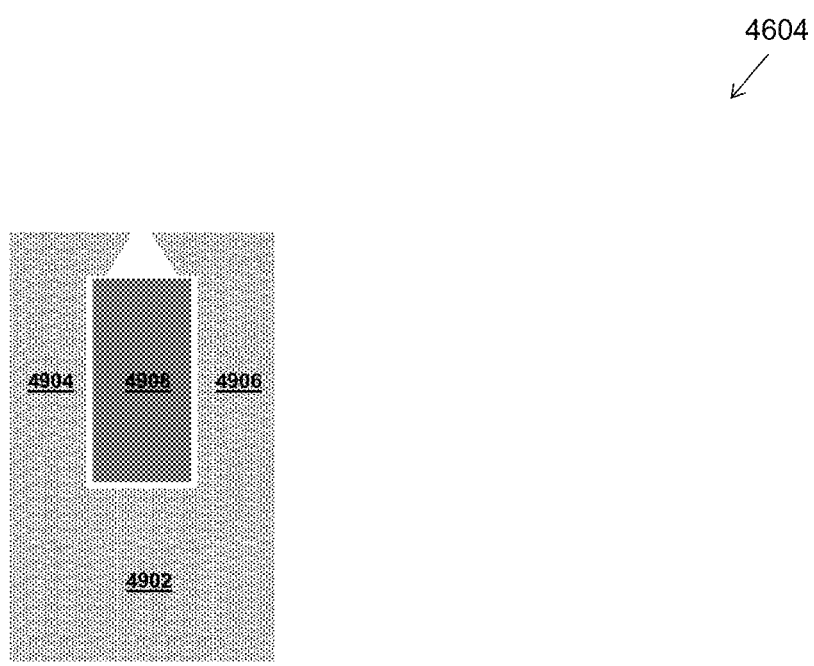
FIG. 49 illustrates a cross sectional view of a rotor conductor of the axial flux induction machine shown in FIG. 46 in accordance with various embodiments of the present disclosure.

FIG. 49 illustrates a cross sectional view of a rotor conductor of the axial flux induction machine shown in FIG. 46 in accordance with various embodiments of the present disclosure. The cross sectional view of FIG. 49 is taken along line A-A' shown in FIG. 48. The rotor phase conductor 4604 is located inside a slot surrounded by magnetic teeth 4904, 4906 and a magnetic base 4902. The magnetic base 4902 provides mechanical support to the teeth 4904, 4906 and the conductor 4908.

The magnetic base 4902 may be part of the motor housing apparatus 4630 shown in FIG. 46. The motor housing apparatus 4630 supports the rotor as well as stator mechanically. The magnetic base 4902 also conducts magnetic flux in a similar role as the yolk in a radial flux machine.

The magnetic base 4902 and the teeth 4904, 4906 may be manufactured as a single part. Alternatively, the magnetic base 4902 and the teeth 4904, 4906 may be manufactured as separate parts. If the teeth 4904, 4906 or the upper portions of the teeth 4904, 4906 are manufactured as separate parts from the magnetic base 4902, the rotor winding may be attached to the magnetic base 4902 before the teeth 4904, 4906 or the upper portions of the teeth 4904, 4906 are assembled onto the rotor. Such an assembling process allows the rotor windings to be premanufactured as a single part through processes like casting, molding, soldering, welding and the like.

Furthermore, the rotor windings may be assembled over a carrier such as a printed circuit board (PCB). A PCB can have appropriate openings to accommodate the teeth. The rotor windings can be implemented as metal tracks on or in the PCB. The core (magnetic material region of the rotor) can be formed by printing, plating or molding the right magnetic material on or around the PCB, and then assembling the core with the PCB through suitable processes such as a baking process, a firing process and the like if needed.

The core can also be pre-manufactured and then placed into the PCB. All or part of the core can be embedded in the PCB. The PCB may be part of the motor housing 4630. The PCB may be any suitable PCB such as ceramic-based, metal-based or plastic based (e.g., FR 4 or FR 5).

The shape and size of the teeth 4904, 4906, and the conductor 4908 can be optimized for improving the system efficiency. With the flexible process available for the PCB, the shapes of the winding and the core can be optimized to achieve high system efficiency, high quality, and low noise at a low cost.

In some embodiments, the core can be manufactured by rolling a silicon steel sheet with the right pattern stamped or cut to form the teeth 4904, 4906 and magnetic base 4902. The teeth 4904, 4906 can also be formed by cutting a silicon steel roll to the right size and right shape with suitable tools such as a laser, an electric wire or a saw. The windings can then be manufactured by casting or molding after the rotor core has been formed. In alternative embodiments, the phase conductors are inserted into the slots, and the phase conductors can be connected with the inner ring and the outer ring through suitable processes such as welding and the like.

Figure 50:
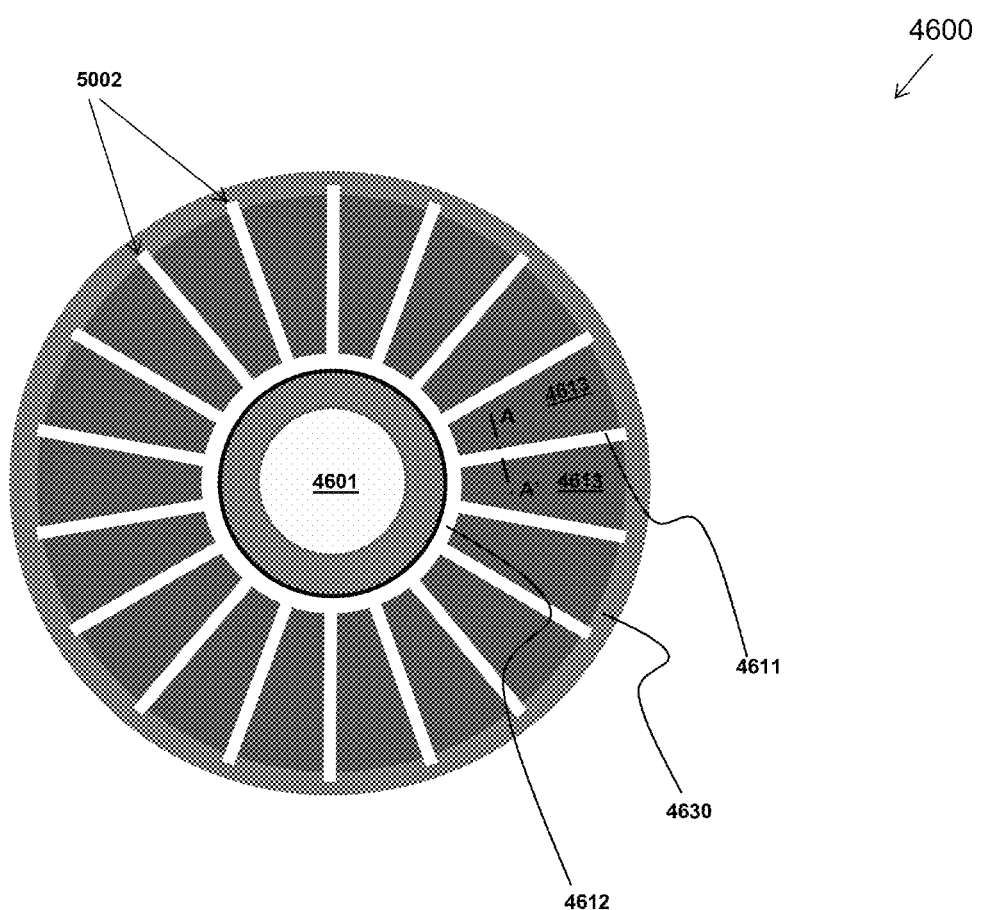
FIG. 50 illustrates a side view of a stator structure of the axial flux induction machine shown in FIG. 46 in accordance with various embodiments of the present disclosure.

FIG. 50 illustrates a side view of a stator structure of the axial flux induction machine shown in FIG. 46 in accordance with various embodiments of the present disclosure. The side view of FIG. 50 is taken from the air gap shown in FIG. 46. The shaft 4601 is at the center as shown in FIG. 50. The shaft 4601 is surrounded by the stator magnetic material regions 4613 which are the top surface of the teeth (shown in FIG. 51). As shown in FIG. 50, phase conductors 4611 are evenly spaced over the stator surface, and connected by a connection ring 4612.

The stator only has one connection ring 4612 at the inner perimeter as shown in FIG. 50. However, as discussed previously, multiple connection rings can also be included. The winding terminals 5002 are located along the outer perimeter of the stator surface as shown in FIG. 50. It is also possible to put the connection ring or connection bars 4612 at the outer perimeter and have the winding terminals 5002 placed along the inner perimeter of the stator. Alternatively, the winding terminals and connection bars can be split between the inner and outer perimeters. For example, some of the winding terminals and connection bars may be placed along the inner perimeter while the other winding terminals and connection bars may be placed along the outer perimeter.

The power converters coupled to the AFIM can be inside or outside the motor housing 4630. The winding connections 5002 may extend outside the motor housing 4630. In alternative embodiments, the winding connections 5002 may be with the motor housing 4630 if necessary. As discussed above, the connection ring may be replaced by multiple connection bars.

The stator can be manufactured in a similar process as that described above with respect to the rotor. Various embodiments described above with respect to FIGS. 1-45 may be applicable to the stator windings of the AFIM.

In the dual configuration shown in FIG. 47, inherently, the stator windings are divided into two groups. Each of these two groups may have a connection bar. In some embodiments, the corresponding phase windings in these two groups can be combined together and fed by one power converter. In some other embodiments, it may be advantageous to treat these two groups separately. The windings of each group may be arranged in a manner similar to that shown in FIG. 23. It should be noted that two groups are merely an example. If necessary, each of these two groups can be further split into more groups.

Figure 51:
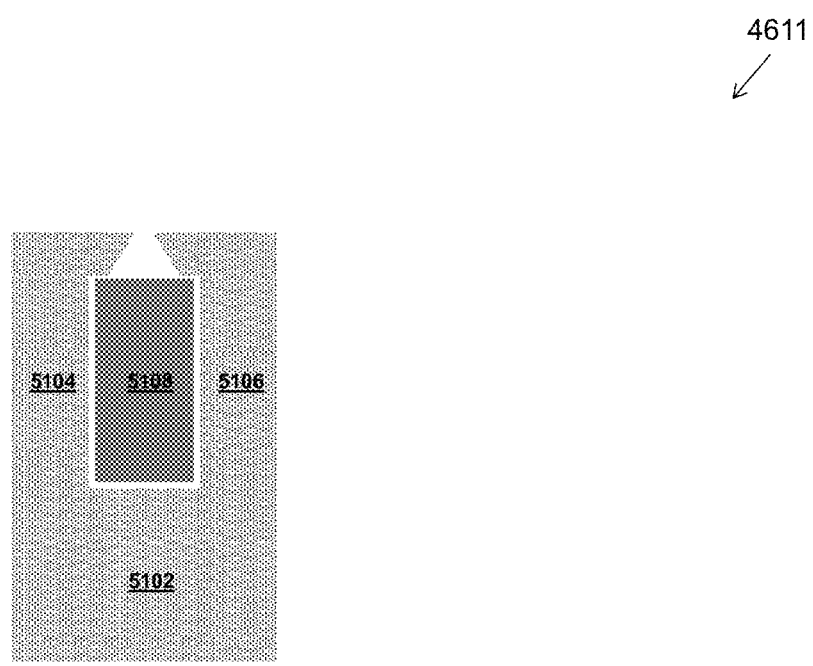
FIG. 51 illustrates a cross sectional view of a stator conductor of the axial flux induction machine shown in FIG. 46 in accordance with various embodiments of the present disclosure.

FIG. 51 illustrates a cross sectional view of a stator conductor of the axial flux induction machine shown in FIG. 46 in accordance with various embodiments of the present disclosure. The cross sectional view of FIG. 51 is taken along line A-A' shown in FIG. 50. The phase winding 4611 is located inside a slot surrounded by magnetic teeth 5104, 5106 and a magnetic base 5102. Only one conductor is shown in the slot, although it is possible to have multiple conductors in a slot, and the connectors in a slot may be connected to different connection bars as discussed previously. Optionally, there may be an insulation layer around the walls of a slot, and/or around part of a conductor. The magnetic base 5102 provides mechanical support to the teeth 5104, 5106 and the conductor 5108. The manufacturing process of the stator conductor is similar to that of the rotor conductor described above with respect to FIG. 49, and hence is not discussed again herein.

In the discussion above, it is assumed that the rotor is able to follow the dynamic reconfiguration in the stator automatically. This is true if the rotor has a squirrel winding structure as shown in induction motors described above. However, other machine types are also suitable to use the DRIM principle. One example is switched reluctance machines. The rotor of a switched reluctance machine comprises salient poles without any power windings. In the switched reluctance machines, the stator has more salient magnetic features. The winding currents of the switched reluctance machine can be controlled to change the number of poles dynamically in operation to optimize the system performance over a wide range. Another example is memory-effect permanent magnet machines, where the number of poles may also be changed with the magnets, so the number of poles in the windings can be dynamically reconfigured accordingly.

The discussion above uses one set of the stator windings as examples. The same principle is also applicable to motors and generators with more than one set of stator windings, such as certain double-fed motors and generators. Also, the same principles can be applied to rotor windings if needed.

Although the discussion above is generally based on motors, the techniques can be applied to generators or motors working in generating (regenerative) mode.

The discussion in this disclosure refers to motors and generators. The technology can be extended to actuators such as magnetic gears and other applications.

The discussion above is generally based on machines with cores and slots. However, the winding techniques and the control techniques, including the various embodiments of connection bars, can be applied to machines without cores (air-core machines) and/or without slots (slot-less machines). In a slot-less machine, the conductors or conductor assemblies are evenly distributed along a perimeter in a machine as if there were evenly distributed slots, so the winding arrangements discussed in the present disclosure can still be used.

Although the discussion above has been generally focused on the context of dynamically reconfigurable machines, the techniques disclosed in this disclosure are also applicable to machines with a fixed number of poles and/or fixed number of phases in a pair of poles.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a stator magnetically coupled to a rotor; and
   a plurality of conductor assemblies distributed evenly along a perimeter of the apparatus, wherein:
      each conductor assembly is distributed into at least two groups of conductors, wherein each group comprising a plurality of conductors;
      all the groups of conductors form a plurality of windings, wherein a winding comprises a positive segment and a negative segment, and wherein the positive segment and the negative segment of the winding are spaced apart by a first electrical angle approximately equal to 180 degrees in a first pole configuration, and wherein each segment has a plurality of groups, and wherein each segment is in more than two conductor assemblies; and
      the plurality of windings are configured to be coupled to a plurality of power converters, wherein each winding is coupled to a dedicated power converter, and wherein the plurality of power converters and the plurality of windings are configured such that a phase angle shift of currents flowing through adjacent windings is adjusted by the plurality of power converters, and wherein as a result of adjusting the phase angle shift, the number of poles of the apparatus is dynamically adjustable, and wherein after the number of poles of the apparatus has been adjusted, in a second pole configuration, the positive segment and the negative segment are spaced apart by a second electrical angle approximately equal to 180 degrees.

2. The apparatus of claim 1, wherein:
each conductor assembly is embedded in a slot of the stator.

3. The apparatus of claim 1, wherein:
a segment of the winding starts with a conductor assembly having conductor groups belonging to different windings.

4. The apparatus of claim 1, wherein:
the positive segment of the winding and the negative segment of the winding are separated apart by 180 space degrees.

5. The apparatus of claim 1, wherein:
the plurality of windings is divided into a plurality of groups, and each group of windings forms a balanced system;
a first group of windings is connected to a first power source through a first power converter group; and
a second group of windings is connected to a second power source through a second power converter group.

6. The apparatus of claim 5, wherein:
the first power source and the second power source are connected in series.

7. The apparatus of claim 5, wherein:
the first group of windings is connected to a first connection bar;
the second group of windings is connected to a second connection bar; and
the first connection bar and the second connection bar are isolated from each other.

8. A system comprising:
a stator magnetically coupled to a rotor;
a plurality of conductor assemblies, wherein:
   each conductor assembly is evenly distributed into at least two groups of conductors, and wherein each group comprising a plurality of conductors; and
   all the groups of conductors form a plurality of windings, wherein a winding comprises a positive segment and a negative segment, and wherein the positive segment and the negative segment of the winding are spaced apart by 180 degrees in a first pole configuration; and
a plurality of power converters, each of which is coupled to a corresponding winding, wherein the plurality of groups of power converters and the plurality of windings are configured such that the plurality of power converters is configured to adjust a phase angle shift of currents flowing through adjacent windings, and wherein as a result of adjusting the phase angle of the current flowing through the corresponding winding, the number of poles of the system is dynamically adjustable, and wherein after the number of poles of the system has been adjusted, in a second pole configuration, the positive segment and the negative segment of the winding are spaced apart by a space angle difference equivalent to 180 degrees.

9. The system of claim 8, wherein:
the plurality of conductor assemblies is embedded in slots of the stator and distributed evenly along a perimeter of the stator.

10. The system of claim 8, wherein:
a segment of the winding starts with a first conductor assembly having first groups of conductors belonging to different windings, and ends with a second conductor assembly having second groups of conductors belonging to different windings.

11. The system of claim 10, wherein:
at least one conductor assembly between the first conductor assembly and the second conductor assembly has third groups of conductors belonging to a same winding.

12. The system of claim 8, wherein:
the at least two groups of conductors are in one slot of the stator and arranged in a top-bottom configuration.

13. The system of claim 8, wherein:
the number of poles in the second pole configuration is K times larger than the number of poles in the first pole configuration, and wherein K is an odd number.

14. A system comprising:
a motor comprising a stator magnetically coupled to a rotor, and a plurality of windings, wherein a winding of the plurality of windings comprises a positive segment and a negative segment, and wherein the positive segment and the negative segment of the winding are spaced apart by 180 degrees in a first pole configuration; and
a plurality of power converters, wherein each power converter is coupled to a corresponding winding, and wherein the plurality of power converters and the plurality of windings are configured such that the plurality of power converters is configured to adjust a phase angle shift of currents flowing through adjacent windings, and wherein as a result of adjusting the phase angle of the current flowing through the corresponding winding, the number of poles of the motor is dynamically adjustable through adjusting the phase angle relationship of currents flowing through the plurality of windings by controlling the plurality of power converters, and wherein after the number of poles of the motor has been adjusted, in a second pole configuration, the positive segment and the negative segment of the winding are spaced apart by a space angle difference equivalent to 180 degrees.

15. The system of claim 14, further comprising:
a plurality of conductor assemblies distributed evenly along a perimeter of the system.

16. The system of claim 15, wherein:
each conductor assembly is evenly distributed into at least two groups of conductors, and wherein all the groups of conductors form the plurality of windings.

17. The system of claim 16, wherein:
the positive segment of the winding is in more than two conductor assemblies, wherein the positive segment of the winding starts with a first conductor assembly having two groups of conductors belonging to different windings.

18. The system of claim 14, wherein:
the number of poles of the motor is dynamically adjusted from a first number to a second number, and the second number is K times larger than the first number, and wherein K is an odd number.

* * * * *